United States Patent
Onis

(10) Patent No.: US 9,904,847 B2
(45) Date of Patent: Feb. 27, 2018

(54) SYSTEM FOR RECOGNIZING MULTIPLE OBJECT INPUT AND METHOD AND PRODUCT FOR SAME

(71) Applicant: MyScript, Nantes (FR)

(72) Inventor: Sébastien Onis, Nantes (FR)

(73) Assignee: MyScript, Nantes (FR)

( * ) Notice: Subject to any disclaimer, the term of this patent is extended or adjusted under 35 U.S.C. 154(b) by 93 days.

(21) Appl. No.: 14/870,735

(22) Filed: Sep. 30, 2015

(65) Prior Publication Data
US 2017/0011262 A1  Jan. 12, 2017

(30) Foreign Application Priority Data
Jul. 10, 2015 (EP) ................... 15290183

(51) Int. Cl.
*G06K 9/00* (2006.01)
*G06K 9/20* (2006.01)

(52) U.S. Cl.
CPC ..... *G06K 9/00422* (2013.01); *G06K 9/00416* (2013.01); *G06K 9/2054* (2013.01)

(58) Field of Classification Search
CPC ............... G06K 9/00402; G06K 9/222; G06K 9/00416; G06K 9/00463; G06K 9/00865; G06K 9/52; G06F 3/04883; G06T 7/60; G06T 7/73
See application file for complete search history.

(56) References Cited

U.S. PATENT DOCUMENTS

| 5,544,262 A | 8/1996 | Pagallo |
| 6,226,403 B1 * | 5/2001 | Parthasarathy ...... G06K 9/4604 345/171 |
| 7,203,903 B1 * | 4/2007 | Thompson .......... G06F 3/04883 382/187 |
| 7,447,360 B2 | 11/2008 | Li et al. |

(Continued)

FOREIGN PATENT DOCUMENTS

EP  0676065  9/2000

OTHER PUBLICATIONS

International Search Report issued for PCT/EP2016/001175 dated Oct. 7, 2016 (4 pages).

(Continued)

*Primary Examiner* — Bhavesh Mehta
*Assistant Examiner* — Ian Lemieux
(74) *Attorney, Agent, or Firm* — McDermott Will & Emery LLP

(57) ABSTRACT

Methods, systems, and computer program products are provided for the recognition of input of multiple objects into a computing device, wherein the computing device has a processor and at least one application for recognizing the input under control of the processor. The application is configured to determine at least one geometrical feature of a plurality of elements of the input, and compare the determined at least one geometrical feature with at least one pre-determined geometrical threshold to determine a positive or negative result. If the comparison yields a negative result, the application considers the elements as belonging to one object in the recognition of the input. If the comparison yields a positive result, the application considers the elements as belonging to multiple objects in the recognition of the input.

13 Claims, 23 Drawing Sheets

(56) References Cited

U.S. PATENT DOCUMENTS

| | | | |
|---|---|---|---|
| 7,724,957 B2* | 5/2010 | Abdulkader | G06K 9/00852 382/185 |
| 8,121,412 B2 | 2/2012 | Predovic et al. | |
| 2003/0190074 A1* | 10/2003 | Loudon | G06K 9/6297 382/187 |
| 2004/0090439 A1* | 5/2004 | Dillner | G06K 9/00402 345/440 |
| 2006/0045337 A1* | 3/2006 | Shilman | G06K 9/00402 382/181 |
| 2006/0062475 A1* | 3/2006 | Li | G06K 9/222 382/203 |
| 2014/0007002 A1 | 1/2014 | Chang et al. | |
| 2014/0162238 A1 | 6/2014 | Carney et al. | |
| 2014/0328540 A1 | 11/2014 | Wang et al. | |

OTHER PUBLICATIONS

Written Opinion of the International Searching Authority issued for PCT/EP2016/001175 dated Oct. 7, 2016 (5 pages).

* cited by examiner

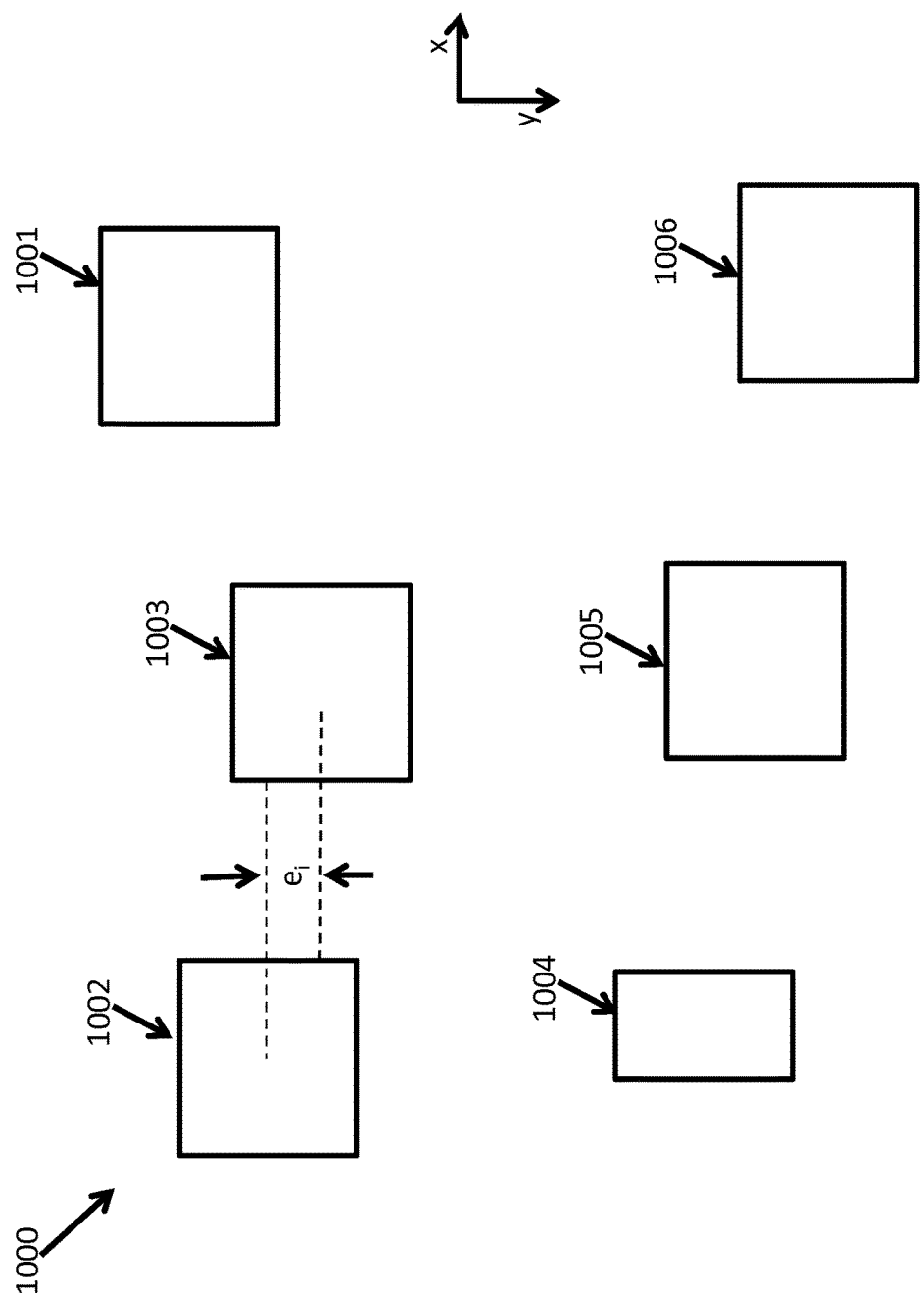

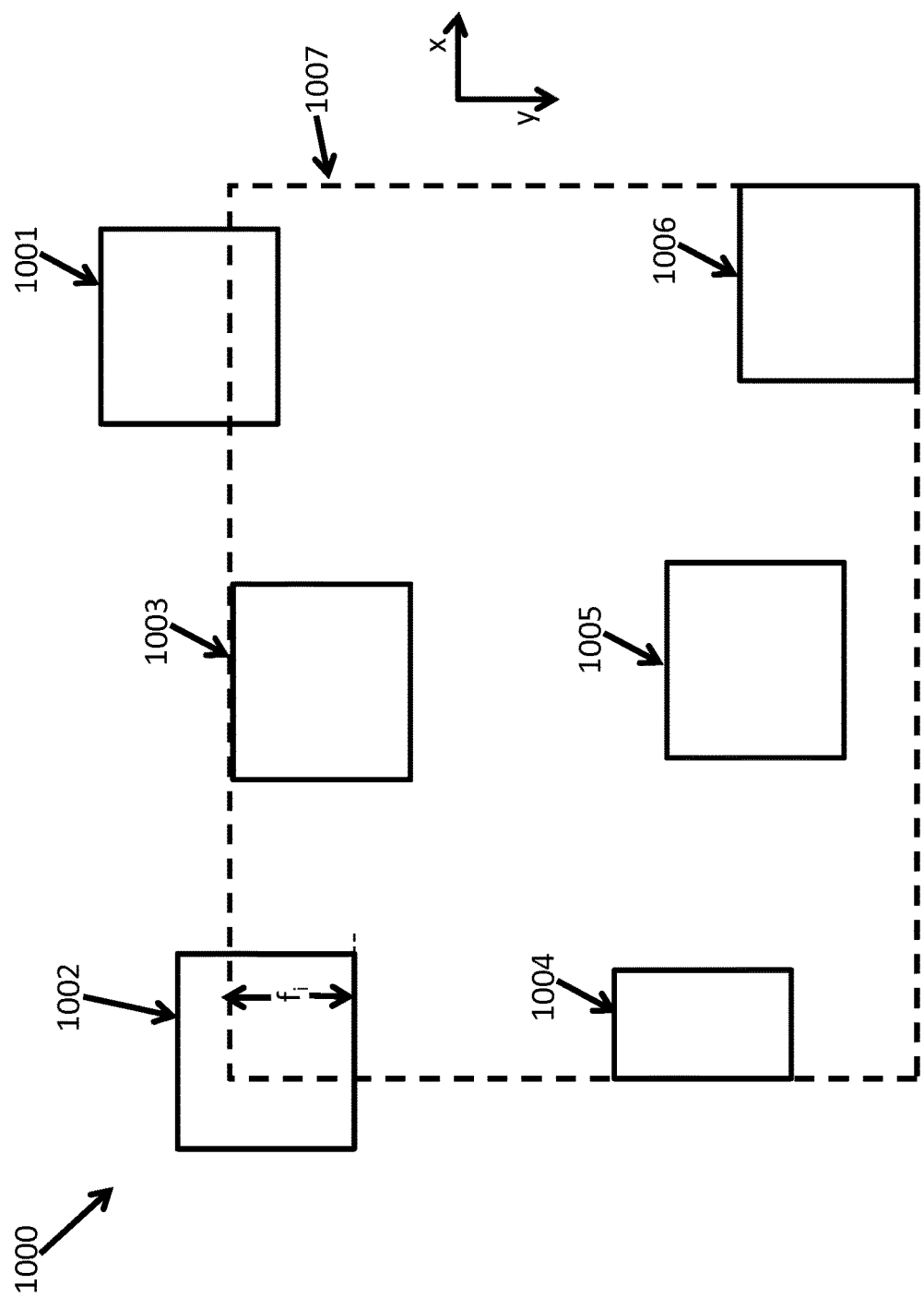

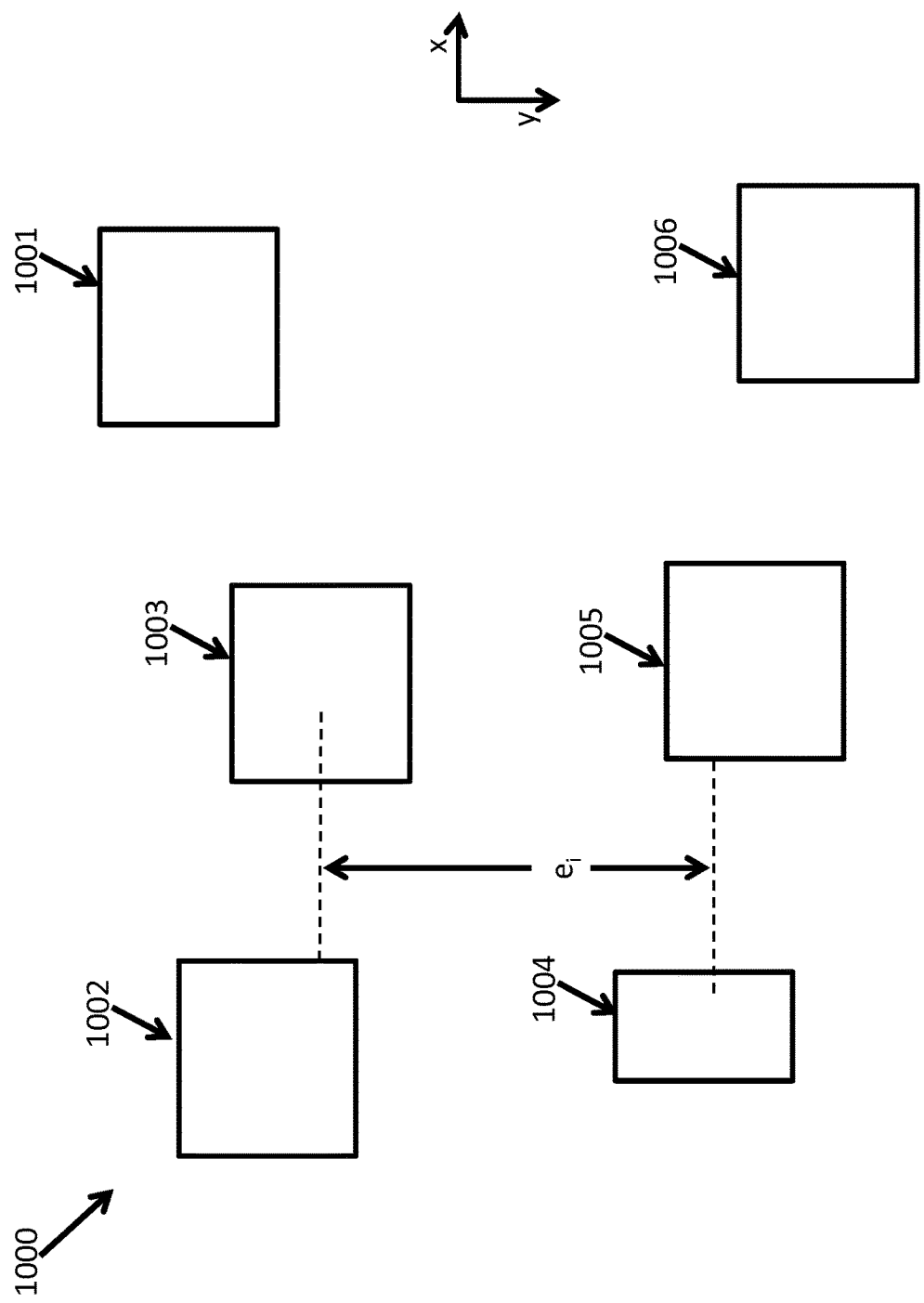

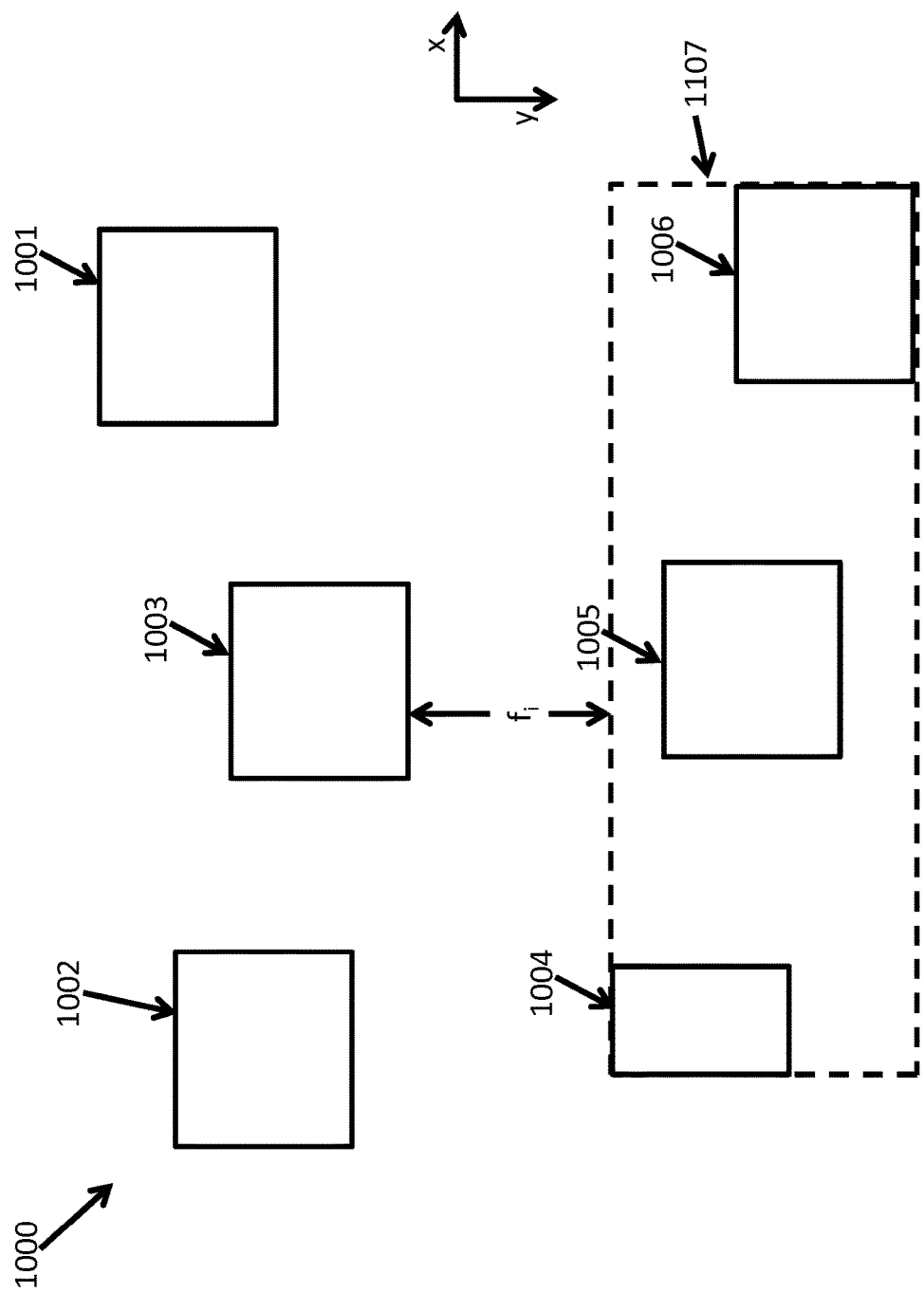

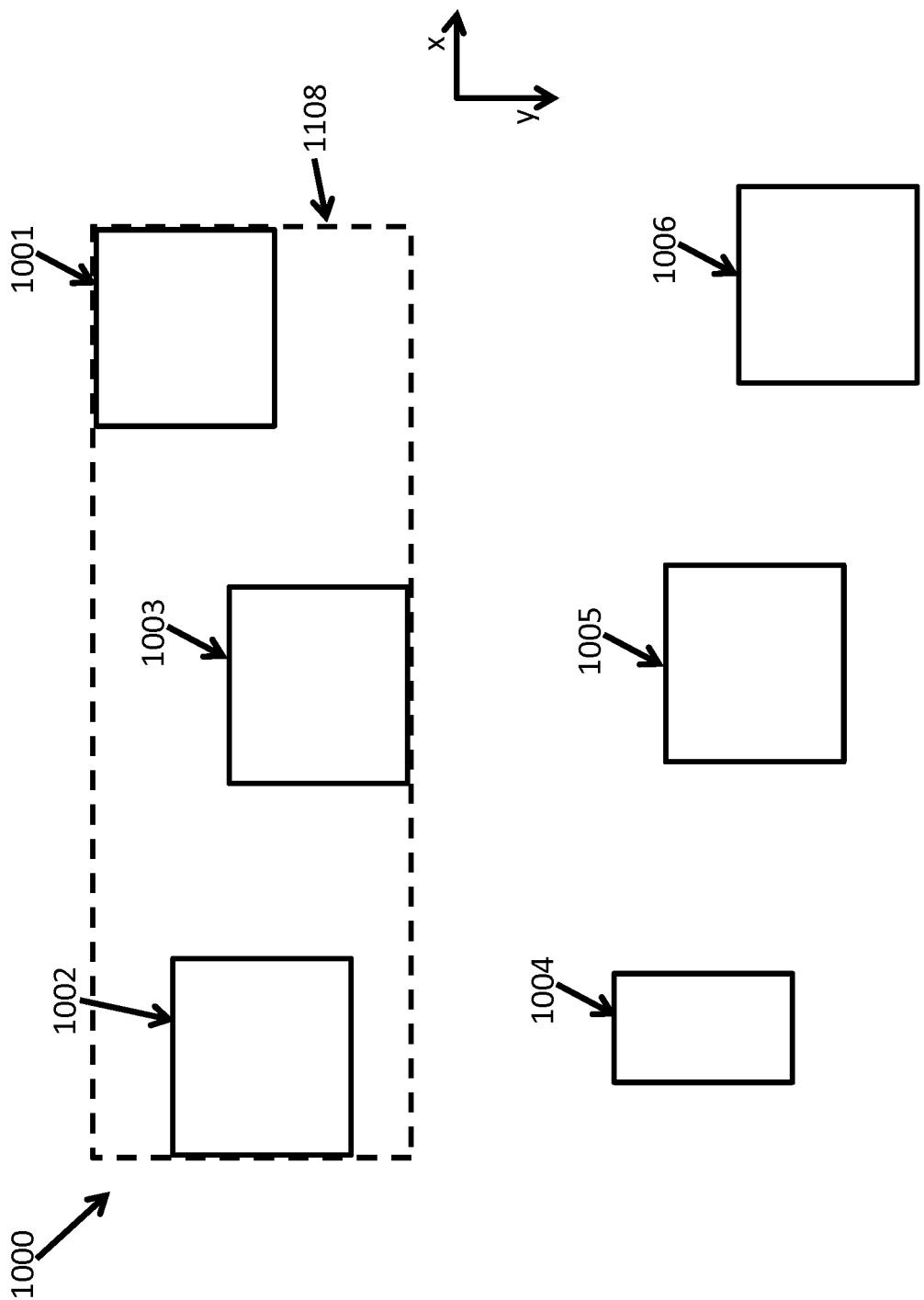

$$\int_0^1 \int_0^{1-y^2} \int_0^{1-x} y \, dz \, dx \, dy$$

$$\int_0^1 \int_0^{1-y^2} \left[z\right]_0^{1-x} y \, dx \, dy$$

$$\int_0^1 \int_0^{1-y^2} y(1-x) \, dx \, dy$$

$$\int_0^1 \left[-\frac{x^2}{2}\right]_0^{1-y^2} y \, dy$$

$$\int_0^1 y \cdot \frac{(1-y^2)^2}{2} \, dy$$

SYSTEM FOR RECOGNIZING MULTIPLE OBJECT INPUT AND METHOD AND PRODUCT FOR SAME

CROSS-REFERENCE TO RELATED APPLICATIONS

This application claims priority to European Application No. 15290183.1 filed on Jul. 10, 2015, the entire contents of which is incorporated by reference herein.

TECHNICAL FIELD

The present invention relates generally to the field of computing device interfaces capable of recognizing input of multiple handwritten objects.

BACKGROUND

The ubiquity of computing devices to daily life continues to grow. They take the form of personal and professional desktops, laptops, hybrid laptops, tablet PCs, e-book readers, mobile phones, smartphones, wearable computers, global positioning system (GPS) units, enterprise digital assistants (EDAs), personal digital assistants (PDAs), game consoles, and the like.

Computing devices generally consist of at least one processing element, such as a central processing unit (CPU), some form of memory, and input and output devices. The variety of computing devices and their subsequent uses necessitate a variety of input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. Either of these methods of input can be used generally for drawing or inputting so-called digital ink to express text, symbols, etc., which the computing device interprets using handwriting recognition systems or methods. Other systems for handwriting input to computing devices include electronic or digital pens which interact with paper, encoded surfaces or digitizing surfaces in order to have their movement relative to the surface tracked by a computing device, such as the systems provided by Anoto AB., Leapfrog Enterprises, Inc., and Livescribe, Inc.

Regardless of the input method used, handwriting recognition systems and methods typically involve determining the initiation of a digital ink stroke, such as when first contact with a touch sensitive surface is made (pen-down event); the termination of the stroke, such as when contact with the touch sensitive surface is ceased (pen-up event); and any movement (gestures or strokes) made between stroke initiation and termination. These determined strokes are processed to interpret the input which is usually performed in several stages including preprocessing, segmentation, recognition, and interpretation. Generally, the pre-processing stage involves discarding irrelevant input data and normalizing, sampling, and removing noise from relevant data. The segmentation stage specifies the different ways to break down the input data into individual elements to be recognized depending on the type of input, e.g., characters, words, symbols, objects, or shapes. The recognition stage generally includes a feature extraction stage, which characterizes the different input segments, and a classification stage which associates the segments with possible recognition candidates. The interpretation stage generally involves identifying the elements associated with the candidates. Less, more, or different stages are also possible.

The type of computing device or input surface can also determine the type of handwriting recognition system or method utilized. For instance, if the input surface is large enough (such as a tablet), the user can handwrite input anywhere on or above the input surface, as if the user was writing on paper. This however adds complexity to the recognition task, because the separate elements to be recognized may be related dependent of the relative positions of the elements or may be unrelated independent of their relative positions.

For example, one desired use for handwriting recognition is in note-taking for the capture of mathematical equations or expressions, physics concepts, chemistry formulas, musical notation, etc., during education sessions, such as classes or lectures. That is, a student may wish to write multiple equations over several lines to express the working of a mathematical problem which the educator has demonstrated (which could also be in digital ink) or which the student is required to solve as an assignment or assessment, or the educator may wish to prepare a worksheet for students involving a list of non-related equations that define a set of problems to be solved by the student, either manually or automatically by the computing device, or the capture of a system of equations or vector/matrix may be desired. The need for the entry of multiple connected or un-connected expressions may also occur in enterprise settings, such as during budget setting meetings, technology research and development sessions, technical documentation, etc., or in personal settings, such as a consumer writing a long addition over several lines whilst grocery shopping in order to calculate the total amount.

Systems for the recognition of handwritten mathematical equations are known. These systems concentrate on determining the elements of input equations through matching against databases/lexicons containing known mathematical symbols and relationships. These systems generally recognize the elements without any consideration of the actual content or structure of the equations themselves. As such when multiple equations are entered, say in a vertical list, it is possible that the recognition may consider elements of intended separate equations to belong to the same equation, or at least the recognition element will form and test hypotheses with respect to this. This of course substantially increases recognition processing and time, and decreases recognition accuracy.

Some known systems relate to providing calculations or likely solutions of input equations, and therefore may take the content into account. However, these systems do not recognize multiple equations input either, rather they recognize the input of mathematical operators, such as the equals sign or a result line, or user gestures, to determine when a solution is to be provided to the currently input equation, such that the next input is inherently another separate equation or an edit to the current equation, see for example European Patent No. 0 676 065.

Other known systems provide recognition of systems of equations and tabular structures, such as matrices, involving equations. However, these systems rely on indicative elements for recognition, such as brackets or spatial alignment, e.g., within rows and columns, and as such do not recognize multiple equations as such rather a structure involving multiple inputs of any type, see for example U.S. Pat. No. 7,447,360.

What is required is a system that recognizes multiple equation inputs independent of links between the equations that do not rely on the input of specific designation elements or gestures and do not significantly increase processing time or complexity to the recognition of the equations themselves whilst retaining sufficient recognition accuracy.

SUMMARY

The examples of the present method, system, and computer program product are described herein below as providing the recognition of input of multiple objects into a computing device, wherein the computing device has a processor and at least one method or system for recognizing the input under control of the processor.

In an aspect of the disclosed method, system, and computer program product the disclosed system and method determines at least one geometrical feature of a plurality of elements of the input, and compares the at least one geometrical feature with at least one pre-determined geometrical threshold to determine a positive or negative result. If the comparison yields a negative result, the disclosed method or system considers the elements as belonging to one object in the recognition of the input. If the comparison yields a positive result, the method or system considers the elements as belonging to multiple objects in the recognition of the input.

The at least one geometrical feature may include one or more distances between pairs of elements of the plurality of elements. The one or more distances may be between one or more factors of the content of each element of each pair of elements. The one or more factors may include at least one of a factor common to the elements of each pair of elements and a geometrical boundary including each element.

Each element of each pair of elements may represent one or more handwritten strokes, such that the common factor is the barycenter of the one or more strokes, the at least one pre-determined geometrical threshold is a barycenter distance threshold, and the comparison yields a positive result if the barycenter distance determined for a pair of elements is greater than the barycenter distance threshold, such that the elements of the pair of elements are considered as belonging to different objects.

The at least one pre-determined geometrical threshold may be a geometrical boundary distance threshold, such that the comparison yields a positive result if the geometrical boundary distance determined for a pair of elements is greater than the geometrical boundary distance threshold, such that the elements of the pair of elements are considered as belonging to different objects.

The comparison may include comparing a first distance with a first pre-determined distance threshold and a second distance with a second pre-determined distance threshold for each pair of elements. In this case, the comparison yields a positive result for a pair of elements if both the first and second distances are greater than the respective first and second pre-determined distance thresholds, such that the elements of the pair of elements are considered as belonging to different objects. For each pair of elements, the first distance may the distance between the common factor of the elements and the second distance may be the distance between the geometrical boundary of the elements, such that the first pre-determined distance threshold is a common factor distance threshold, and the first pre-determined distance threshold is a geometrical boundary threshold.

The elements of each pair of elements may be geometrically adjacent, and the method or system may be configured to determine at least one of a positional and temporal order of input of the elements of the plurality of elements.

The at least one geometrical threshold may be pre-determined with consideration of the determined temporal order of input of the elements.

For at least one pair of the pairs of elements, the method or system may be configured to determine the at least one geometrical feature by determining the geometrical boundary distances between pairs of elements which each contain a first element having a first positional order relationship with one element of the at least one pair and a second element having a second positional order relationship with the other element of the at least one pair, and determining the minimum distance of the determined geometrical boundary distances. In this case, the at least one pre-determined geometrical threshold includes a geometrical boundary distance threshold, such that the comparison includes comparing the determined minimum geometrical boundary distance with the geometrical boundary distance threshold, and the comparison yields a positive result if the determined minimum geometrical boundary distance is greater than the geometrical boundary distance threshold, such that the elements of the at least one pair are considered as belonging to different objects.

The positional order may be directional, with the first and second directional relationships being first and second directions from the elements of the at least one pair, respectively.

The pairs of first and second elements may contain first elements within a geometrical area of the second element. In this case, each element of each pair of elements represents one or more handwritten strokes, and the geometrical area is based on a characteristic of the one or more handwritten strokes.

The multiple objects may be one or more geometrical separated handwritten mathematical equations, with the elements being handwritten characters, symbols and operators of each of the multiple mathematical equations.

BRIEF DESCRIPTION OF THE DRAWINGS

The present system and method will be more fully understood from the following detailed description of the examples thereof, taken together with the drawings. In the drawings like reference numerals depict like elements. In the drawings:

FIGS. 10A-10C show an example of the present system for recognizing a multiple object input in accordance with the present system and method;

FIGS. 11A-11D show an example of the present system for recognizing a multiple object input in accordance with the present system and method;

FIG. 16 shows another example of a handwritten mathematical equation input in accordance with the present system.

DETAILED DESCRIPTION

In the following detailed description, numerous specific details are set forth by way of examples in order to provide a thorough understanding of the relevant teachings. However, it should be apparent to those of ordinary skill in the art that the present teachings may be practiced without such details. In other instances, well known methods, procedures, components, and/or circuitry have been described at a relatively high-level, without detail, in order to avoid unnecessarily obscuring aspects of the present teachings. Reference to and discussion of directional features such as up, down, above, below, lowest, highest, horizontal, vertical, etc., are made with respect to the Cartesian coordinate system as applied to the input surface on which the input to be recognized is made.

The various technologies described herein generally relate to multiple handwritten object recognition. The system and method described herein may be used to recognize a user's natural writing or drawing style input to a computing device through the processes of pre-processing and recognition. The user's input to the computing device can be made via an input surface, such as a touch sensitive screen, connected to, or of, the computing device or via an input device, such as a digital pen or mouse, connected to the computing device. Whilst the various examples are described with respect to recognition of handwriting input using so-called online recognition techniques, it is understood that application is possible to other forms of input for recognition, such as offline recognition (ICR) in which images rather than digital ink are recognized.

Figure 1:
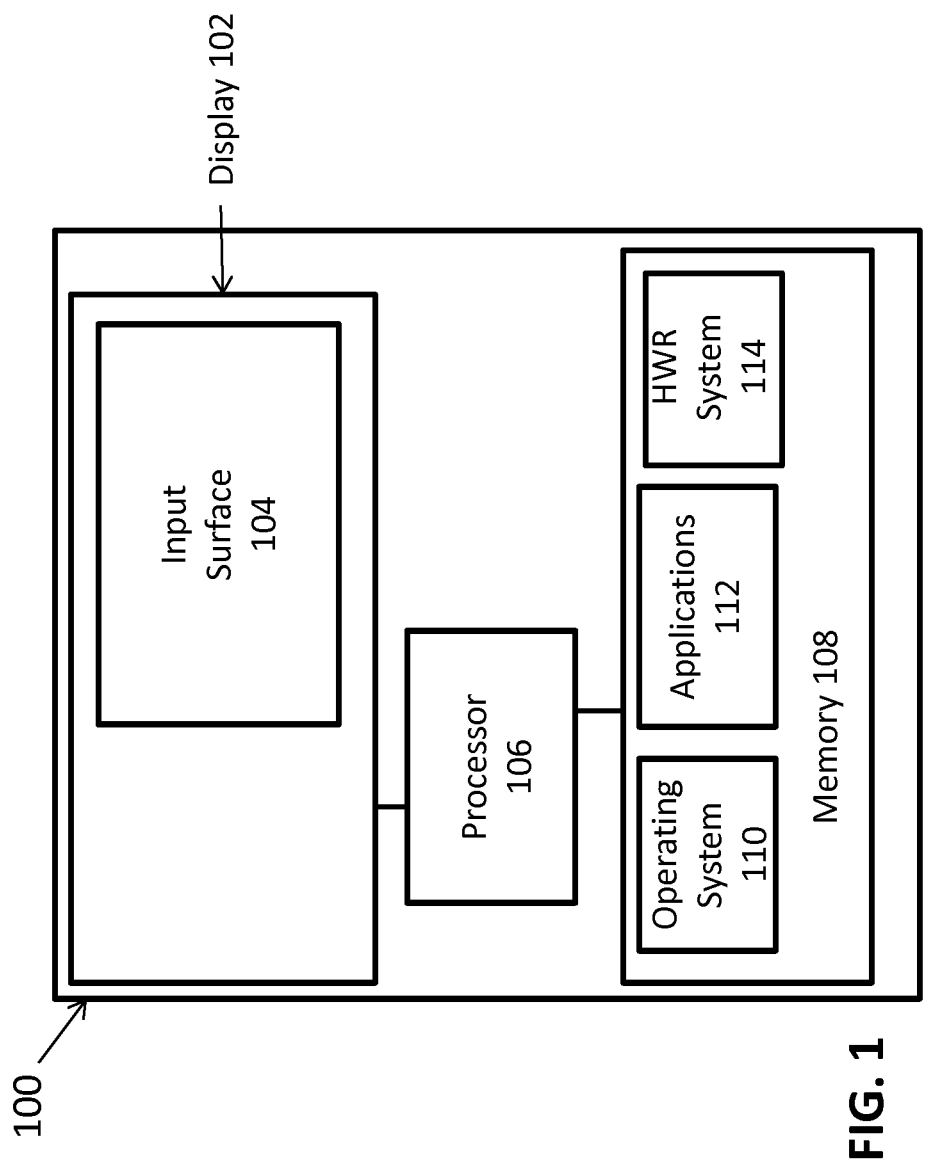
FIG. 1 shows a block diagram of a computing device in accordance with an example of the present system and method.

FIG. 1 shows a block diagram of an example computing device 100. The computing device may be a computer desktop, laptop, tablet PC, e-book reader, mobile phone, smartphone, wearable computer, digital watch, interactive whiteboard, global positioning system (GPS) unit, enterprise digital assistant (EDA), personal digital assistant (PDA), game console, or the like. Computing device 100 includes at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in memory 108 includes an operating system 110, applications 112 and a handwriting recognition (HWR) system 114, which may each include one or more separate computer programs, each of which has an ordered listing of executable instructions for implementing logical functions. The operating system 110 controls the execution of the applications 112 and the HWR system 114. The operating system 110 may be any proprietary operating system or a commercially available operating system, such as WEBOS, WINDOWS®, MAC and IPHONE OS®, LINUX, and ANDROID. It is understood that other operating systems may also be utilized.

The applications 112 may be related to handwriting recognition as described herein, different functions, or both. The applications 112 include programs provided with the computing device 100 upon manufacture and may further include programs uploaded or downloaded into the computing device 100 after manufacture. Some examples include a text editor, telephone dialer, contacts directory, instant messaging facility, computer-aided design (CAD) program, email program, word processing program, web browser, and camera.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, or a symbol, with slight variations, the present system accommodates a variety of ways in which each object may be entered whilst being recognized as the correct or intended object.

Figure 2:
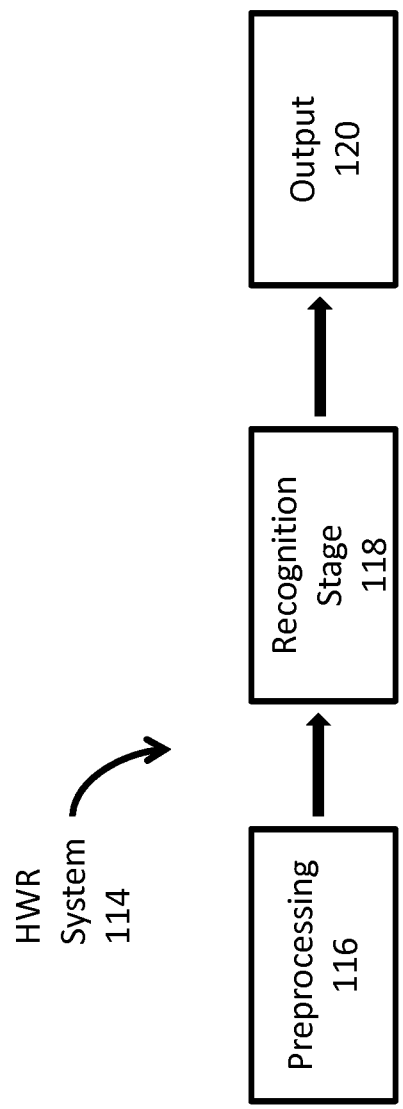
FIG. 2 shows a block diagram of a system for handwriting recognition in accordance with an example of the present system and method.

FIG. 2 is a schematic pictorial of an example of the HWR system 114. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
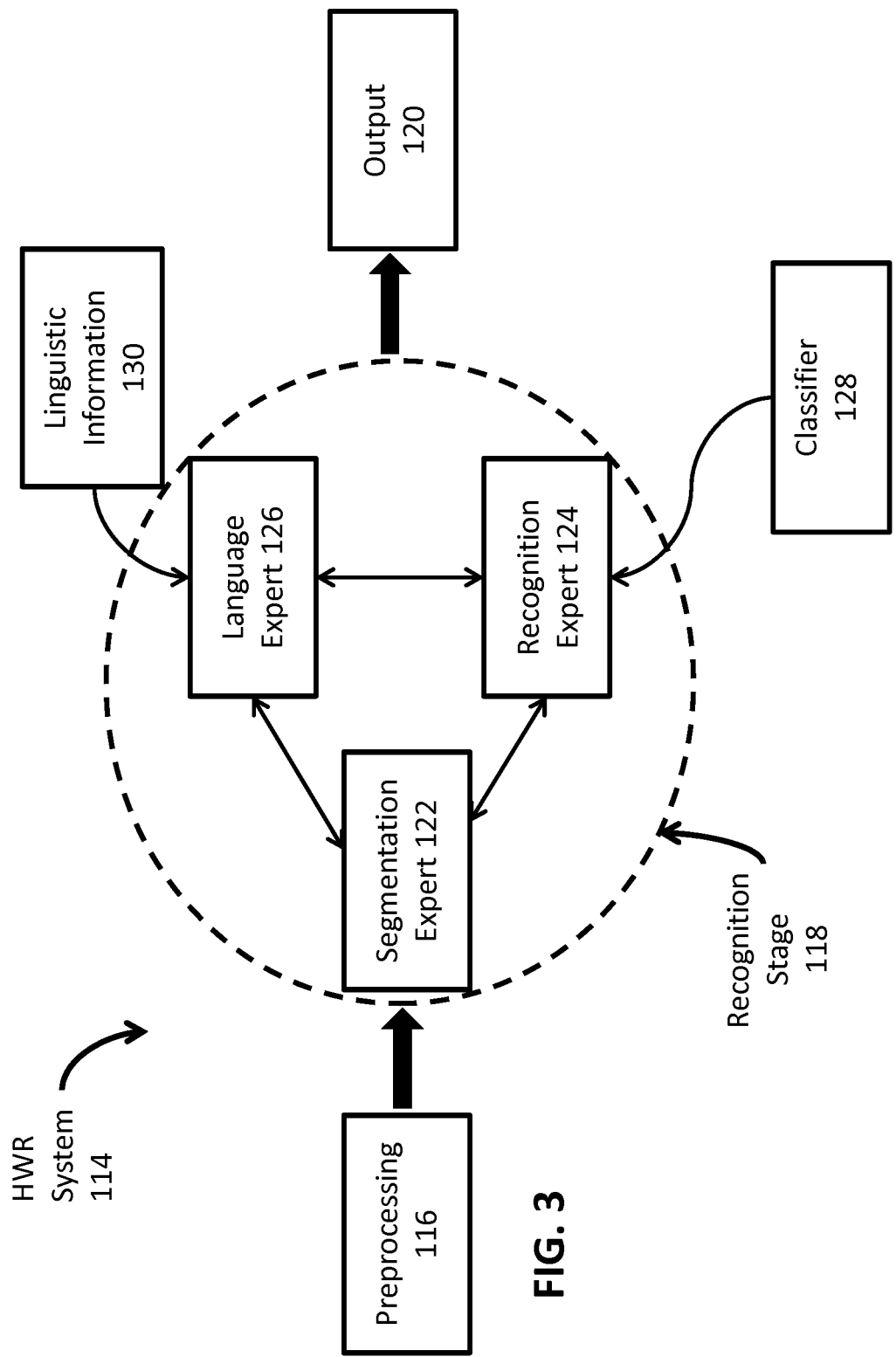
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts (segmentation expert 122, recognition expert 124, and language expert 126) are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., mathematical equations, words, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. The language expert 126 aims at finding the best recognition path. In one example, the language expert 126 does this by exploring a language model such as final state automaton (determinist FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The system and method described herein makes use of the HWR system 114 in order to recognize multiple equations.

Multiple equations are defined as the layout of several equations on one or more pages. The equations can be linked (e.g., a sequence or system of equations, showing different steps of a demonstration) or not (e.g., several exercises on a topic).

Figure 4:
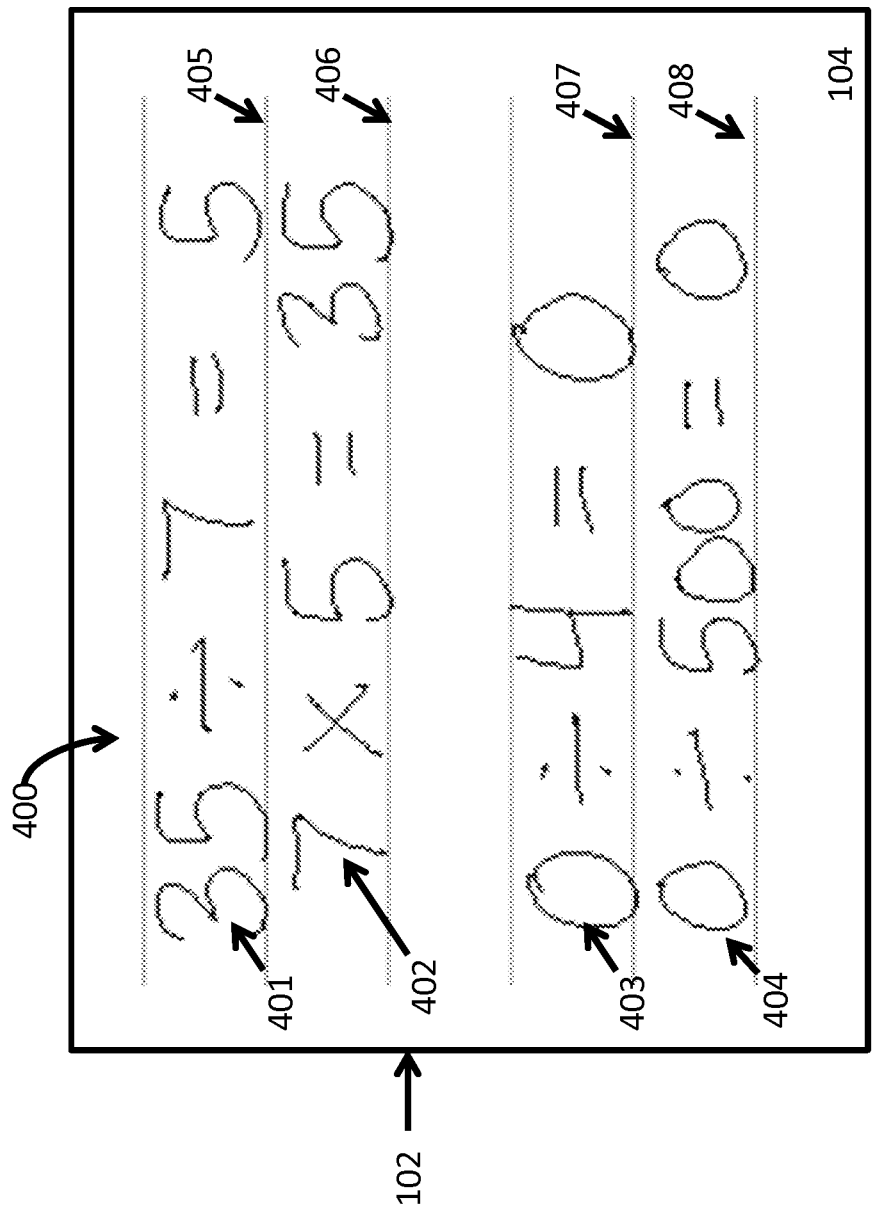
FIG. 4 shows an example of handwritten mathematical equations input in accordance with the present system.

FIG. 4 illustrates an example of a vertical list 400 of handwritten mathematical equations or expressions 401-404, which has been input via the input surface 104. Each equation has been written on separate lines 405-408 (these lines may be actually displayed on the display 102 to guide user input, but this is not necessary). Each equation is independent of the other equations, being complete unlinked operations. Further, each equation is relatively simple, being division or multiplication operations of two numbers with a single number result.

If only the first handwritten equation 401 was present, say, the recognition stage 118 would create and test multiple hypotheses using its experts. The candidates for each element within the equation 401, i.e., '3', '5', '÷', '7', '=' and '5' would be considered and scored to provide the output 120 of the recognized typesetted versions of the elements, i.e., '35÷7=5'. In order to create the hypotheses, many candidates are considered including various concatenations of the individual segmented strokes of each element.

However, since the subsequent handwritten equations 402-404 are present in the example of FIG. 4 without explicit recognition of there being multiple equations or detection of certain mathematical operates, the recognition stage 118 would be required to create and test multiple hypotheses using its experts for not only the elements within the first equation 401 but also for the elements in all four equations, which increases the level of processing and influences the possible recognition accuracy. This extra processing would be necessary because mathematical or arithmetical equations are two-dimensional (2D), e.g., horizontal and vertical. This is different than text, where each line of text is substantially one-dimensional (1D), e.g., horizontal (with the exception of superscript and subscript text which can be dealt with by the language expert, for example), such that only inter-line hypotheses are created and tested during text recognition is the presence of words that are split over the lines (e.g., with hyphenation). Therefore, it cannot be assumed that multiple equations are present just because multiple lines are present. For example, the equation 401 could be written with '35' as the nominator, '7' as the denominator, and the '÷' symbol as a dividing line. The equation 401 would then occupy more than one vertical line in that form.

Figure 5:
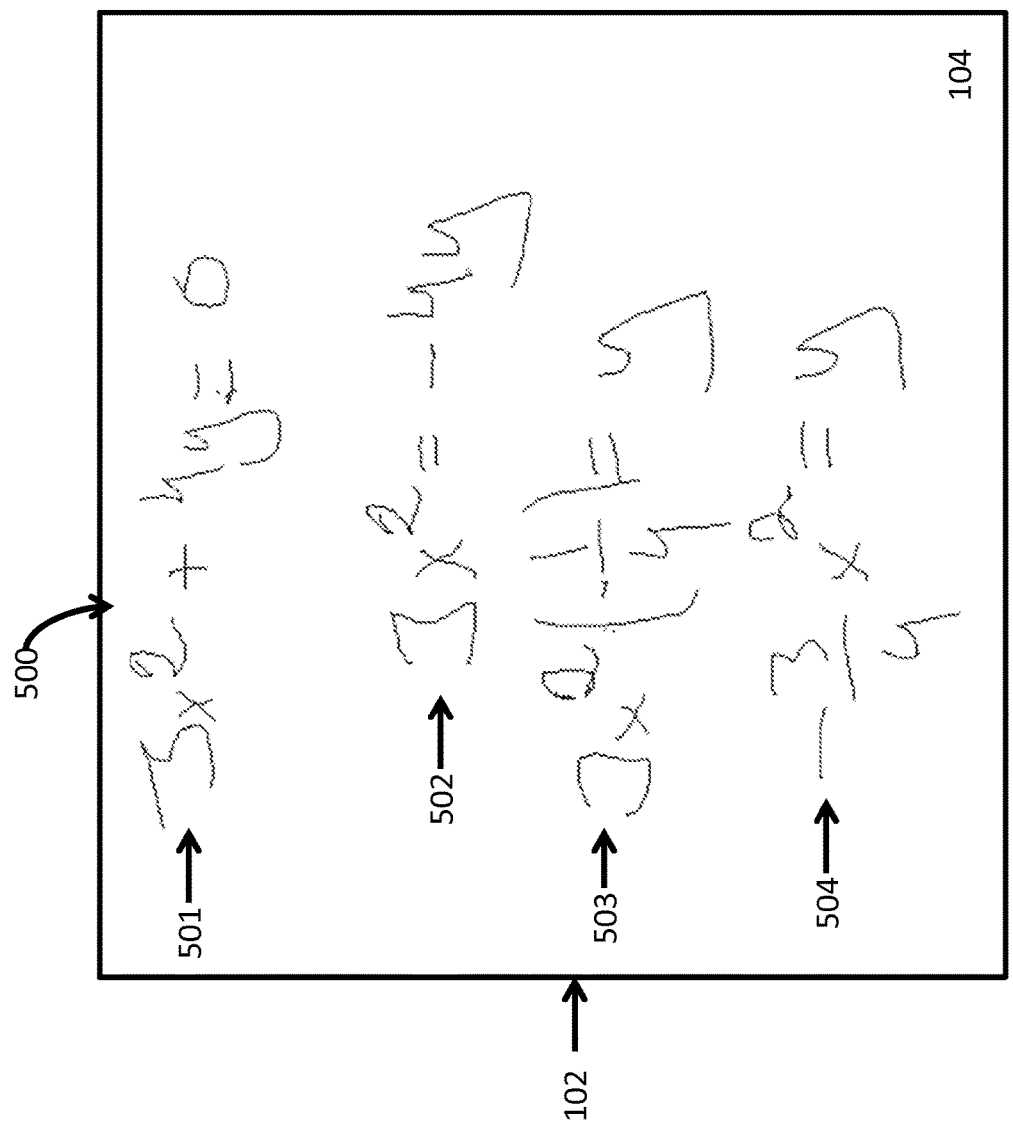
FIG. 5 shows an example of handwritten mathematical equations input in accordance with the present system.

FIG. 5 illustrates a vertical list 500 of multiple handwritten equations in which re-expression of an initial equation 501 over multiple equations 502-504 is input. As can be seen, each of the equations 501-504 includes both horizontally displaced and vertically displaced elements.

This also applies to any handwritten input of a 2D system of objects, such as drawings, geometrical sketches, charts, graphs, diagrams, tables, circuits, music, chemical formulas, etc., in which multiple objects are input and need to be separately recognized. Detecting the presence of multiple 2D objects prior to creating extraneous hypotheses therefore assists in the reducing recognition processing overhead (e.g., time and memory resources) and in the increasing recognition accuracy (e.g., unintended but otherwise probable candidates based on the expert models are not tested).

One method of detecting multiple input objects would be to require specific user action, such as creating a new writing area, tapping a new object/line physical or virtual button, inputting certain handwritten gestures—e.g., a downward stroke—or other interactions—e.g., a tap on the input surface in order to indicate the end of input of an object. However, such specific user actions would not provide a satisfactory experience for the users as they are not included in natural handwriting. The recognition process of multiple 2D objects should not be affected in a way that reduces the users' experience of the system or which places constraints on the type of input that will be recognized. For example, the recognition of mathematical operator symbols in the equations, such as the equals symbol '=' in FIGS. 4 and 5, could be used to detect the input of multiple equations. However, this assumption would restrict users from using multiple equalities on one line—e.g., $(x+1)(x+2)=x^2+2x+x+2=x^2+3x+2$—or starting equations with operators—e.g., writing '=' as the first element in the development of a demonstration or working of a problem or writing '+' as the first element as a continuation of the equation written on the previous line.

Another example of the recognition stage 118 for detection of multiple 2D objects input as a vertical list includes the determination of empty vertical space (i.e., space of the input surface 104 on which handwritten strokes are not input) between vertically displaced handwritten objects using geometrical features of elements of the input objects. Vertical empty space greater than a predetermined size, e.g., a threshold, is detected. This is a process of 'cutting' the input into sections to classify or filter those cuts above the threshold as being a space between individual objects, such as equations. All elements over multiple lines are not considered in subsequent processing by the experts of the recognition stage 118 as belonging to the same equation. This significantly cuts down the number of hypotheses created and tested. The classification is performed by allocating one or more geometrical costs. The threshold includes (vertical) geometrical cost(s), which is adjustable so that the filtering can be performed in order to optimize or train the filtering process to determine suitable threshold levels that optimize multiple object detection without returning a substantial number of false positives. This example is similarly applicable in the horizontal direction.

Figure 6:
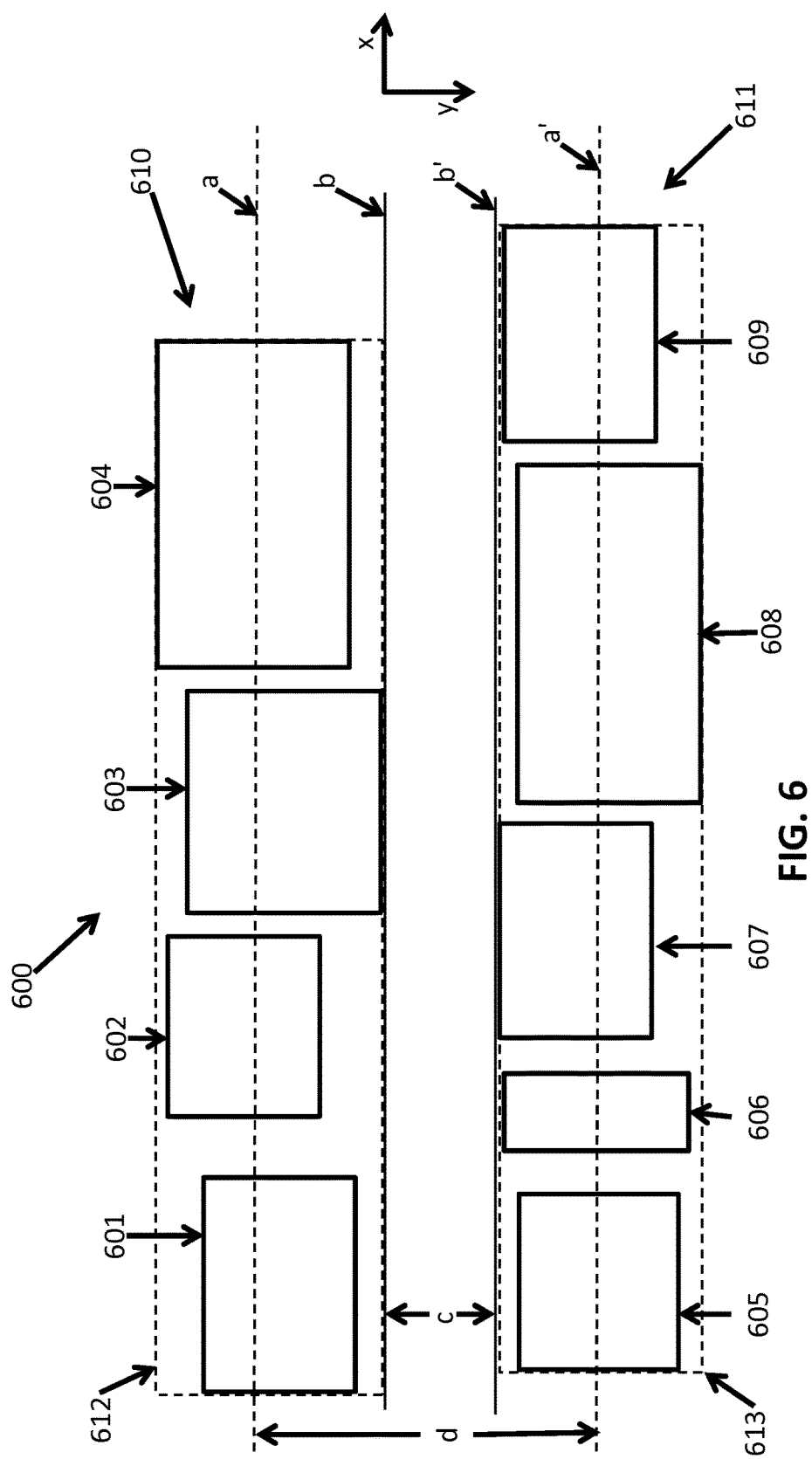
FIG. 6 shows an example multiple object input in accordance with the present system and method.
Figure 7:
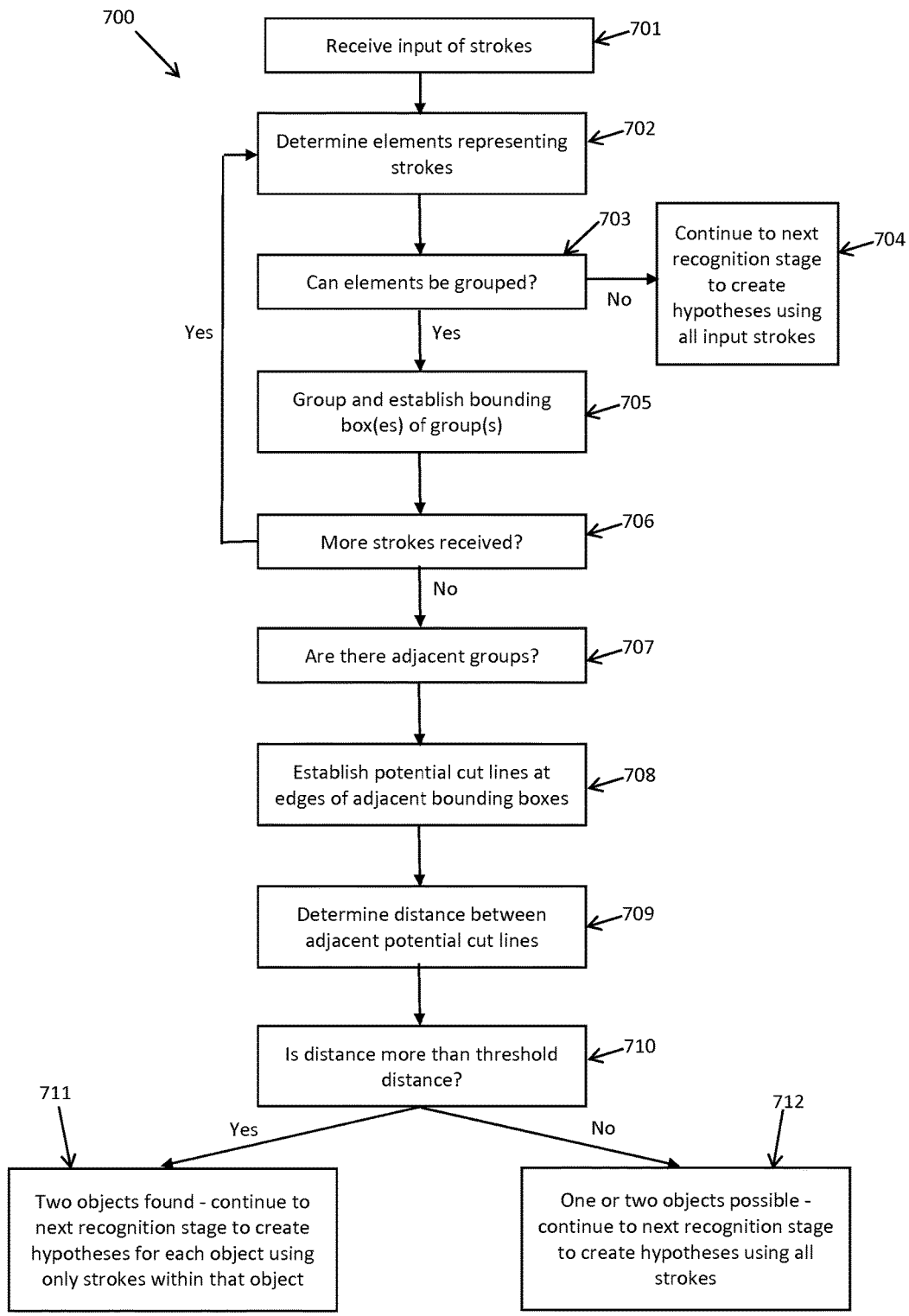
FIG. 7 shows a flow diagram of an example of the present system and method for recognizing a multiple object input to the computing device.

FIG. 6 illustrates an example of a vertically displaced multiple object input 600 on the input surface 104, and FIG. 7 is a flow diagram of an example method 700 for recognizing the multiple object input 600. The multiple object input 600 includes multiple elements 601-609 illustrated as boxes containing one or more handwritten strokes that have been input. The boxes may be bounding boxes around the extent of each stroke or set of strokes of an element. Each of the elements 601-609 has been written with horizontal (designated as the 'x' direction) and/or vertical (designated as the 'y' direction) displacement with respect to each of the other elements 601-609. However, the elements 601-604 are generally written in a first horizontal group 610 (i.e., along dashed horizontal line a) and elements 605-609 are generally written in a second horizontal group 611 (i.e., along dashed horizontal line a'), where line a is vertically displaced from line a'. The first group of elements may represent a first equation and the second group of elements may represent a second equation.

The input of handwritten strokes are received (step 701) and the elements are determined (step 702). It is then determined if groups of the elements can be established (step 703). If they cannot, the elements are sent to the next stage to create hypotheses using all input strokes (step 704). If the elements can be grouped, a bounding box is established about each group (step 705). In FIG. 6, a first bounding box 612 is established about the first group 610 of elements and a second bounding box 613 is established about the second group 611 of elements. These groupings and bounding boxes are reassessed and adjusted if more strokes are received (step 706).

Then it is determined if adjacent groups are present (step 707). If so, 'cut' lines at adjacent bounding box edges are established in the y and/or x directions depending on the application (step 708). In FIG. 6, a potential first horizontal cut line b is established at the lowest (i.e., in the y direction) edge of bounding box 612 and a potential second horizontal cut line b' is established at the highest (i.e., in the y direction) edge of bounding box 613. The geometrical feature of the distance between adjacent cut lines is calculated/measured to determine a geometrical cost for use in the next recognition stage, can be done by a pixel count (step 709). The calculated distance is then compared to a pre-determined threshold distance (step 710), where the pre-determination of the threshold may be made in consideration of the pixel resolution of the input surface 104. In FIG. 6, for example, the distance c between cut lines b and b' represents the height of the empty space between the two element groups being the closest vertical distance between the two groups, which is the distance between the lowest element of the first group 610, being the element 603, and the highest element of the second group 611, being the element 607.

If the geometrical cost is above the threshold, the first and second groups represent two separate 2D objects, such as two equations, and the next recognition stage hypotheses does not involve elements of adjacent multiple objects being created or tested (step 711). This simplifies recognition and increases recognition speed. On the other hand, if the geometrical cost is below the threshold, hypotheses for all elements of the determined groups have to be created and tested by the next recognition stage (step 712).

The example shown in FIG. 7 is an iterative process that may be performed as handwritten strokes are input. Alternatively, the process may be performed on previously input information, such that step 706 is omitted and steps 701-705 are performed for all strokes before launching into the geometrical cost test of steps 707-712. Therefore, the determination of multiple element input and grouping of the elements, through determination of the positional order of the elements, is performed prior to the multiple object recognition process.

Figure 8:
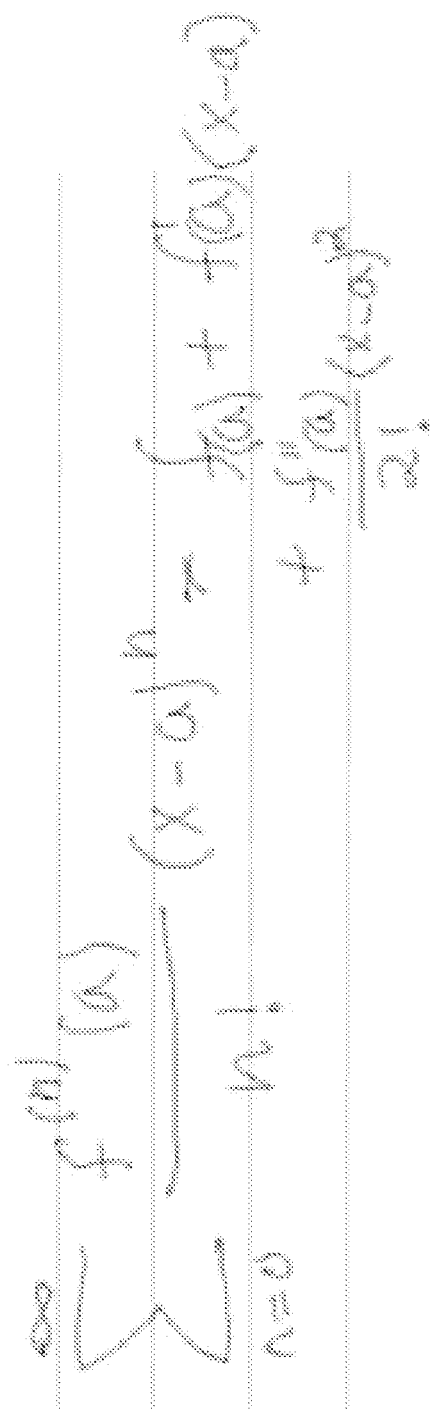
FIG. 8 shows an example of a handwritten mathematical equation input in accordance with the present system.

The setting of the threshold described in FIGS. 6 and 7 is done so a high level of confidence is achieved if geometrical cost alone is to be used to determine separate vertically displaced objects. However, it is understood the geometrical cost threshold is adjustable depending on the application or type of handwritten input and level of confidence required. For example, handwritten input of mathematical symbols, within a single equation the size and relative positioning of each stroke/element can vary greatly. Vertical overlapping of several elements can occur, and vertical displacement over several lines can also occur, as in FIG. 8. In such a case, the confidence level must be higher in order to accept vertical geometrical cost alone as an indicator of multiple equation input. Adjustment of geometrical cost threshold may be provided through a lookup table or like system in which certain thresholds are predefined based on application and other factors, such as stroke size, number of stokes, etc.

In the example described above, vertically separated input is searched by establishing groups of horizontally displaced elements. These groups may first be established by performing a search for horizontal empty space between horizontally adjacent elements until there are no more horizontally adjacent elements. Those elements are considered a group, and a bounding box is established about the boundary thereof to contain all elements in both the x and y directions. This grouping may be refined by setting a horizontal distance threshold or horizontal geometrical cost, so elements or groups of elements that are horizontally displaced by a large distance are not grouped together. For example, mathematical equations may not be expected to have large gaps in a single equation, whereas in drawing input large gaps between drawing elements may be intended for geometrical information.

Grouping may also be made based on positional relationships other than a vertical relationship, including horizontal relationships for horizontally displaced elements which overlap vertically—e.g., elements 601-604—or general positional relativity such as geometrical features. This grouping may be based on elements sharing a common trend-line or virtual center of gravity in the y-direction. This could be based on the common geometrical features of the strokes themselves (e.g., the barycenter) or common or non-common geometrical features of the elements (e.g., edges of the bounding boxes, mean center-lines of the y-direction extents of each bounding box, the horizontal lines a and a' in FIG. 6, or different edges of the elements themselves). Further, the vertical distance d between the common lines a and a' could be used instead of, or additional to, the vertical distance c to establish the geometrical cost or a plurality of geometrical costs.

The above steps of the recognition stage 118 can be considered as 'pre-processing' or 'filtering' based on a threshold with the purpose of reducing the number of possibilities (and so the processing time) to cut the handwritten input into individual objects. Accordingly, this process may be carried out in either preprocessing 116 or the recognition stage 118, depending on the computer device 100. The confidence applied to this filtering depends on the application and type of handwritten input, as well as the desired level of accuracy. Further, this filtering may also be part of the decision making process for recognizing multiple objects, such as a vertical list of equations. The recognition stage 118 may be supplemented with consideration of other factors to create and explore different segmentation hypotheses, for example, using the grammar and language models. Accordingly, the threshold may factor in more than the geometrical cost for optimization.

For instance, the threshold may factor in the temporal or time-order entry of the strokes/elements. By taking the time-order of input into account, success of filtering is enhanced for instance in the horizontal input of a group of elements followed by a second group of one or more elements vertically displaced from the first group indicates potential multiple object entry, such as multiple equations. Whereas, the vertical input of a group of elements followed by the input of one or more elements horizontally displaced from the first group may indicate, a single equation having vertical functions, e.g., divisions.

Figure 9:
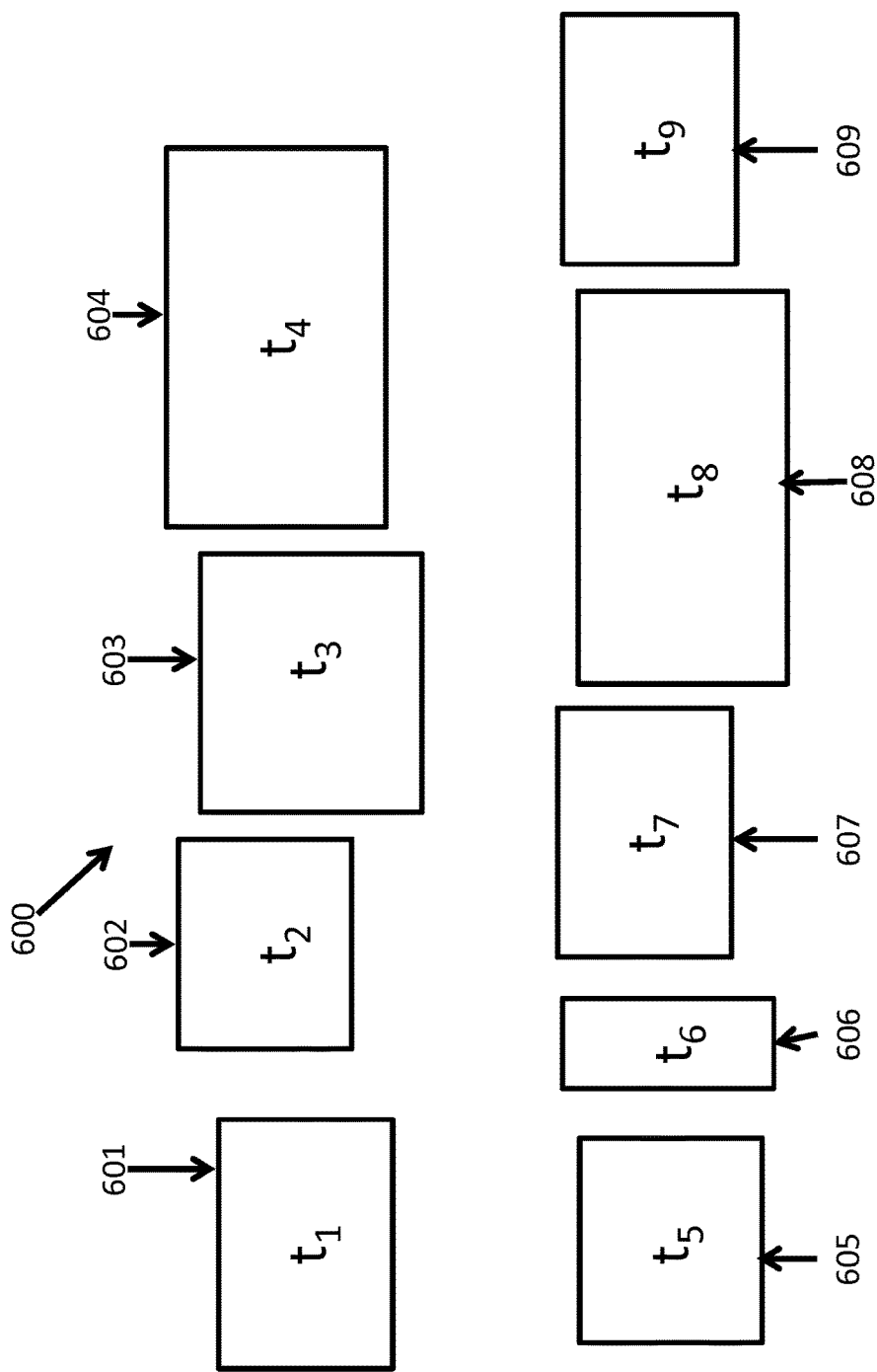
FIG. 9 shows the example multiple object input of FIG. 6 with time-order detail.

FIG. 9 illustrates input 600 of FIG. 6 using the time-order. The elements 601-609 are input in the time-order $t_1$-$t_9$, respectively. The determination of input timing is known to those of skill in the art, and may include the monitoring and storing of the time stamp of the completion of a stroke, e.g., at pen-up, as determined from the system clock of the operating system 110. From this time-order, a time cost can be supplemented with the geometrical cost for the next step of the recognition stage 118.

For example, element 604 is vertically displaced from element 605, and element 604 is horizontally displaced by a relatively large horizontal distance from element 605. A similar horizontal distance exists between elements 601 and 604, but there are intervening elements 602 and 603. All of this relative geometrical information could be used to determine whether the element 605 belongs to a new object or at least does not belong to the element group 610. However, the geometrical cost may be below, but near, the geometrical cost threshold such that the system is not confident of multiple equation detection. If the system uses time-order information to determine element 604 was input at time $t_4$ directly before the input of the element 605 at time $t_5$ the time-order difference, being the time cost, could be used to boost the geometrical cost to be above the geometrical cost threshold. A combined threshold could be set in which the geometrical and time costs are compared. A weighted threshold could also be used to apply different weightings to the geometrical cost threshold based on the time-order.

Other factors can also be used to hone the multiple object detection through the setting of combined thresholds and/or adjustment of calculated costs for comparison with the threshold(s). These factors include absolute and relative locations of the elements (e.g., determination of barycenter or relative distances between adjacent elements), which may be most useful when the time-order is not aligned with the position-order (e.g., if in FIG. 9, element 604 was input prior to elements 602 and 603, which often occurs in handwritten equation input due to the types of operations and formulas being captured). Further, the language model(s) of the language expert may be used to determine if the input of certain elements and their relative placement with respect to other elements indicates single or multiple objects, for example, a mathematical or arithmetical language model may interpret a long horizontal element (e.g., a single stroke) vertically displaced from one or more adjacent elements as indicating a division rather than multiple equations. Furthermore, the number of strokes in individual and adjacent/grouped elements may also be taken into account, either alone or in consideration of the language model(s). For example, a relatively small number of strokes may indicate input of a single object whereas a relatively large number of strokes may indicate multiple objects.

The above described recognition of a vertical list of objects based on grouping of horizontally displaced elements has the purpose of reducing the processing through not considering the geometrical relationship between all vertically separated objects when creating hypotheses for recognition in subsequent recognition processing. While processing speed is important to the user experience, accuracy of the recognition is just as important. Typically handwriting recognition systems compromise between speed and accuracy, increasing accuracy typically increases processing time and decreasing processing time typically decreases accuracy. In order to provide an effective system, a balance between these factors needs to be found. In the alternative, the following example includes multiple geometrical costs to provide a better balance between time and accuracy.

Figure 10A:
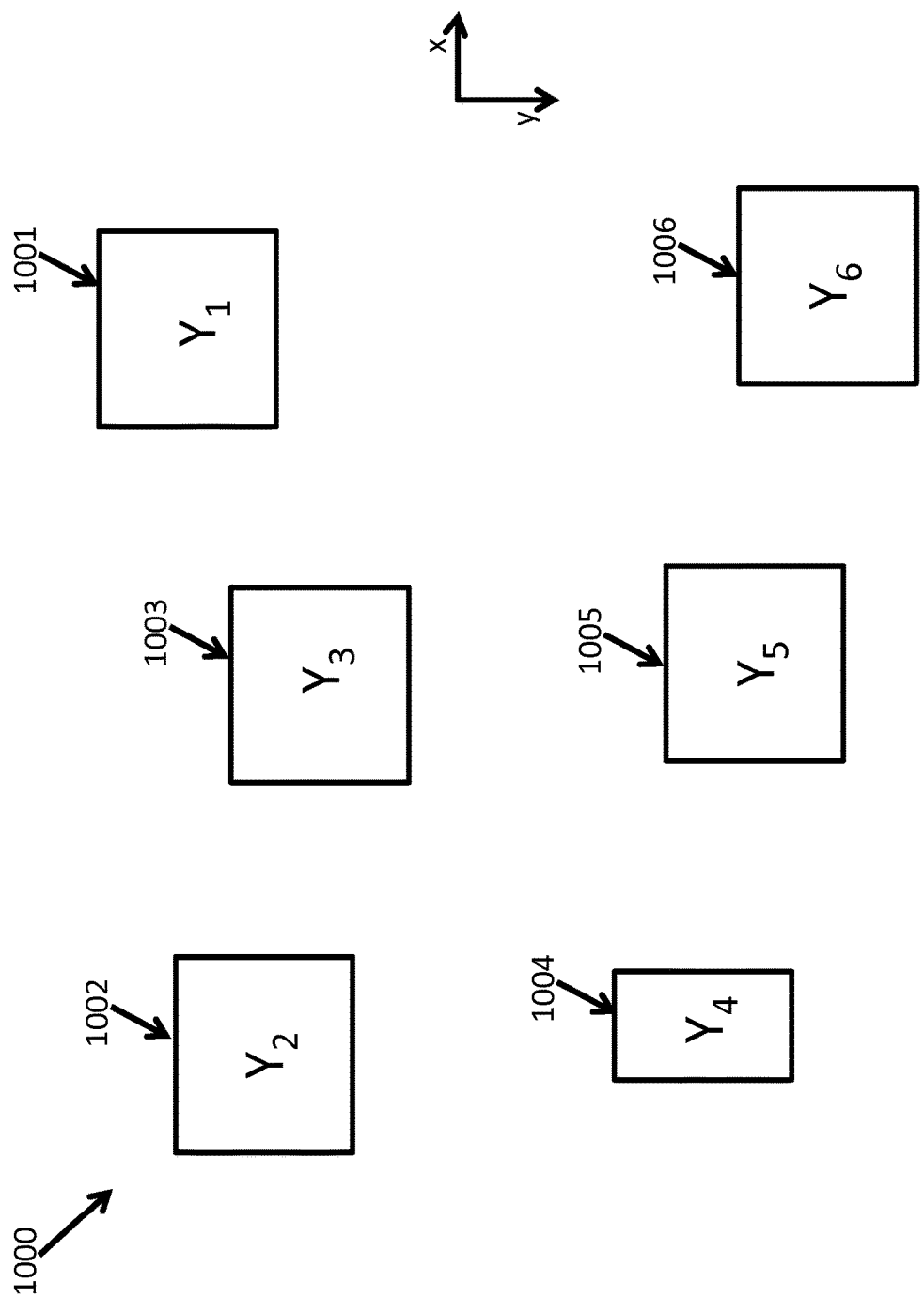
Figure 11D:
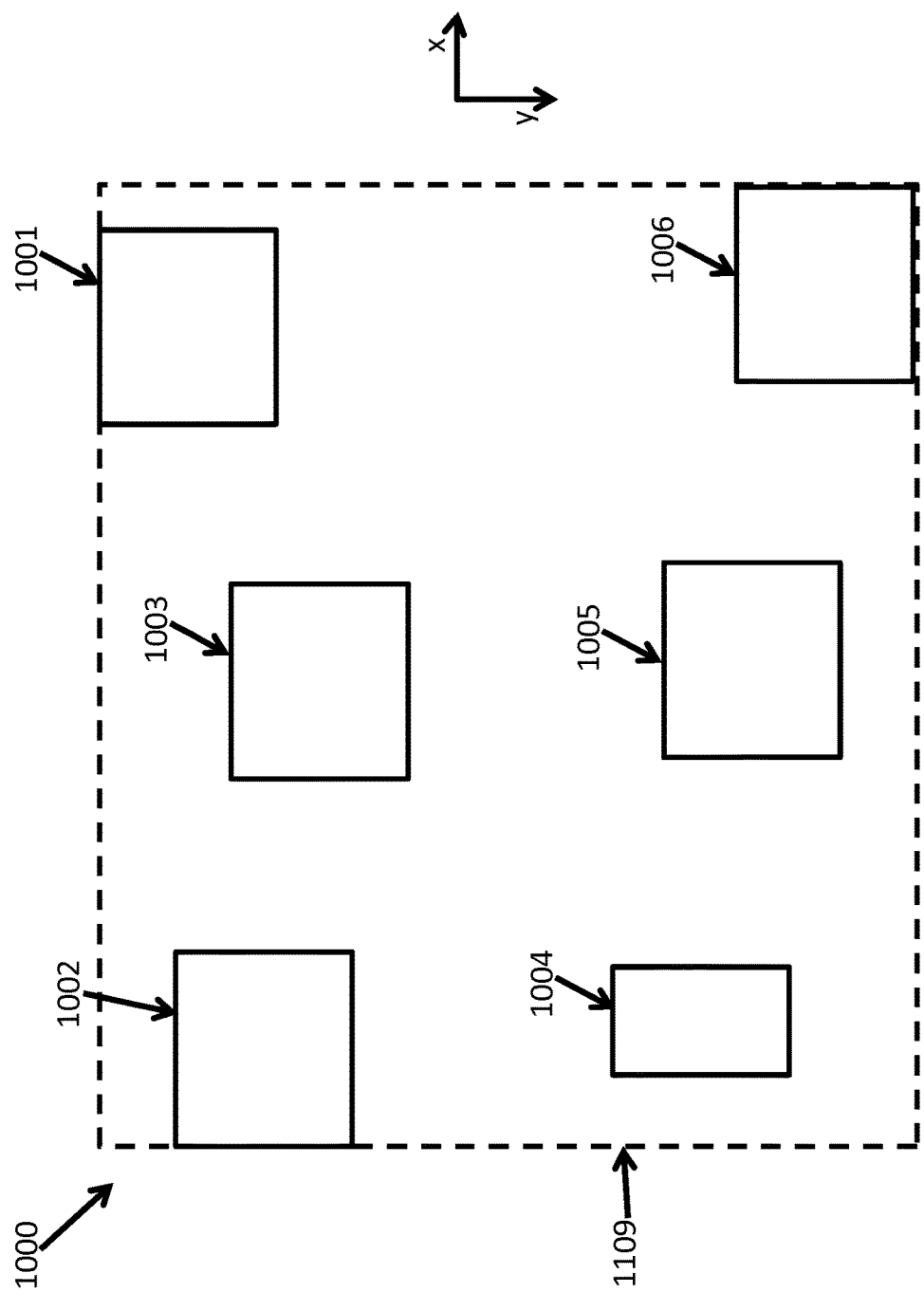
Figure 12A:
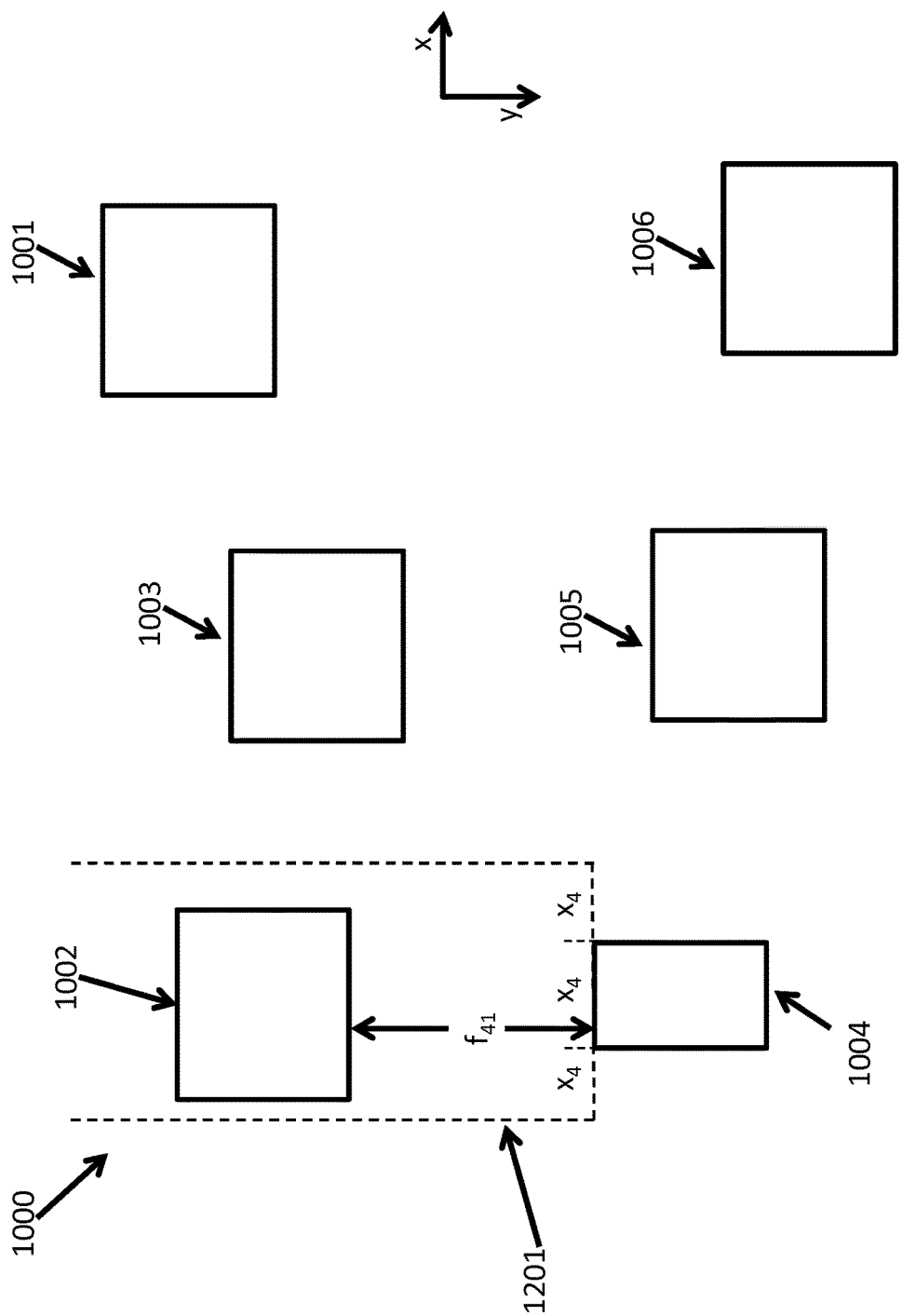
FIGS. 12A and 12B show an alternative example of the method or system of FIG. 11 in accordance with the present system and method.
Figure 12B:
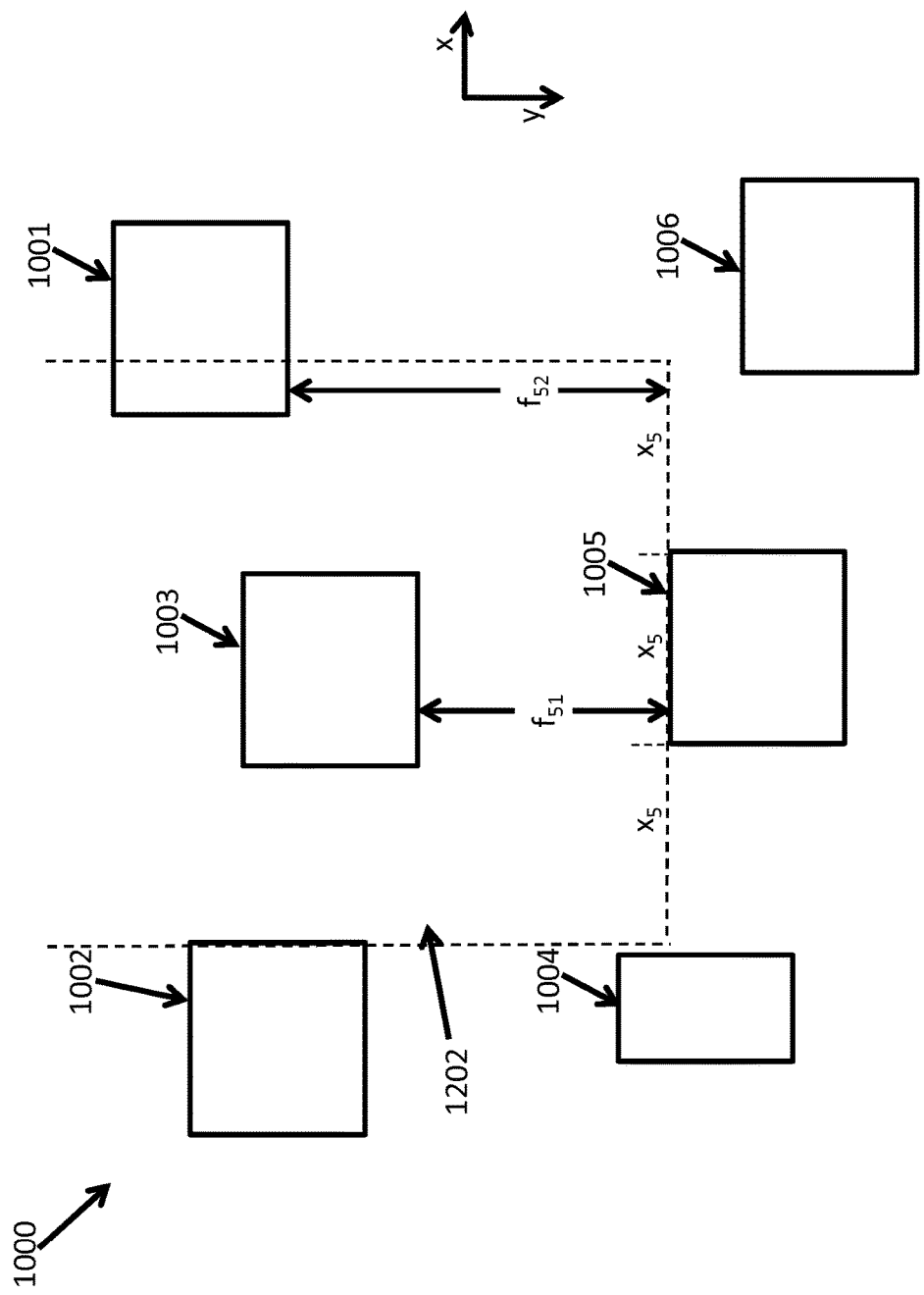

FIGS. 10A-10C show steps in an example recognition stage 118 for a vertically displaced multiple object input 1000. FIGS. 11A-11D show steps in the example recognition stage as applied to another element of the input 1000. FIGS. 12A and 12B show steps in an alternative example recognition system and method as applied to the elements of FIG. 11.

The input 1000 includes multiple elements 1001-1006 illustrated as boxes containing one or more handwritten input strokes. The boxes may be bounding boxes around the extent of each stroke or set of strokes of an element. Each of the elements 1001-1006 has been written with horizontal (designated as the 'x' direction) and/or vertical (designated as the 'y' direction) displacement with respect to each of the other elements 1001-1006. In order to recognize whether elements 1001-1006 belong to one or more vertically displaced objects, process 1300 is performed as illustrated in the flow diagram of FIG. 13.

Figure 13:
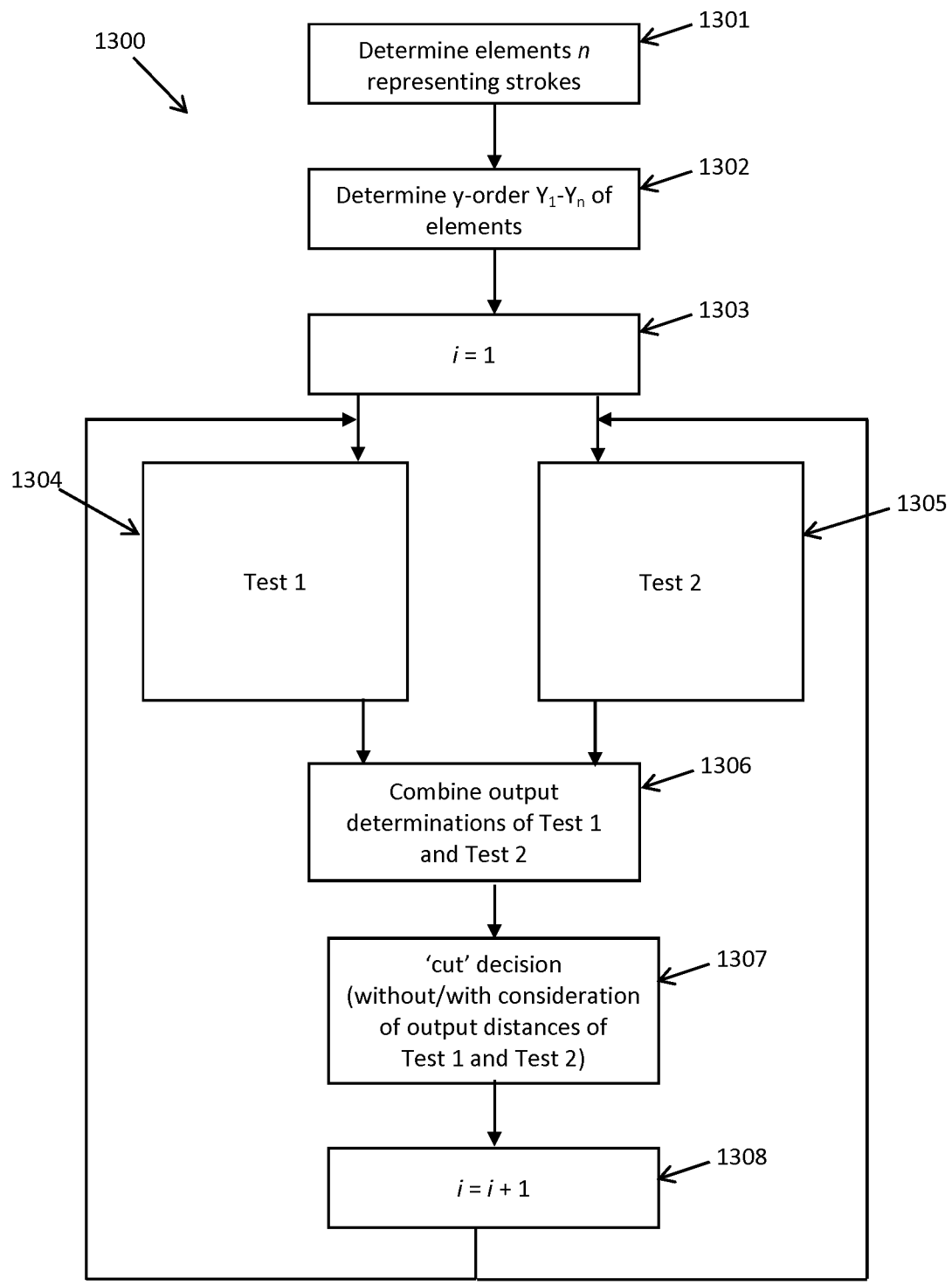
FIG. 13 shows a flow diagram of the example methods of FIGS. 10-12.

This process begins with the determination of the number n of elements present (i.e., n=6 in the present example) representing the input of multiple handwritten strokes (step 1301). The y-order, being a positional or directional order of entry in the y-direction, of these n elements is then determined (step 1302) as $Y_1$ to $Y_n$. In the present example as depicted in FIG. 10A, the elements 1001-1006 are respectively determined to have the y-order $Y_1$-$Y_6$. Element 1001 has y-order $Y_1$, and element 1006 has y-order $Y_6$. Then, an incremental parameter i is set to 1 (step 1303) for later use. Then two tests are performed on the y-order elements, Test 1 (step 1304) and Test 2 (step 1305). In FIG. 13, Tests 1 and 2 are shown as being performed in parallel, however they may be performed serially in any order. The purpose of these multiple tests is to determine different geometrical costs for different geometrical relationships of the n elements and to test these costs against different thresholds to facilitate the determination of whether multiple objects are present, where the determination of the geometrical costs by the system involve different speed and accuracy levels. Test 1 (1304) is described in more detail later with reference to the flow diagram FIG. 14, and Test 2 (1305) is described in more detail later with reference to the flow diagram FIG. 15.

Tests 1 and 2 are performed iteratively for each consecutive y-order element (beginning with the first element, e.g., $Y_1$, as designated by step 1303). The geometrical cost determinations of Tests 1 and 2 are considered together (step 1306) in order to allow a decision as to whether a 'cut' line should be created at the lowest (in the y-direction) edge of the current y-order element, i.e., between that element and the elements below, thereby defining a boundary between vertically displaced objects (step 1307). This cut line creation may include defining a bounding box about the elements considered to possibly belong to the same object, thereby grouping elements for which the different geometrical costs were determined to be below the corresponding confidence thresholds in the sequential y-order iteration. Once this decision is made, the parameter i is incremented to i+1 (step 1308) and processing returns to implement Tests 1 and 2 for the next consecutive element until the final element of the input is tested.

Figure 14:
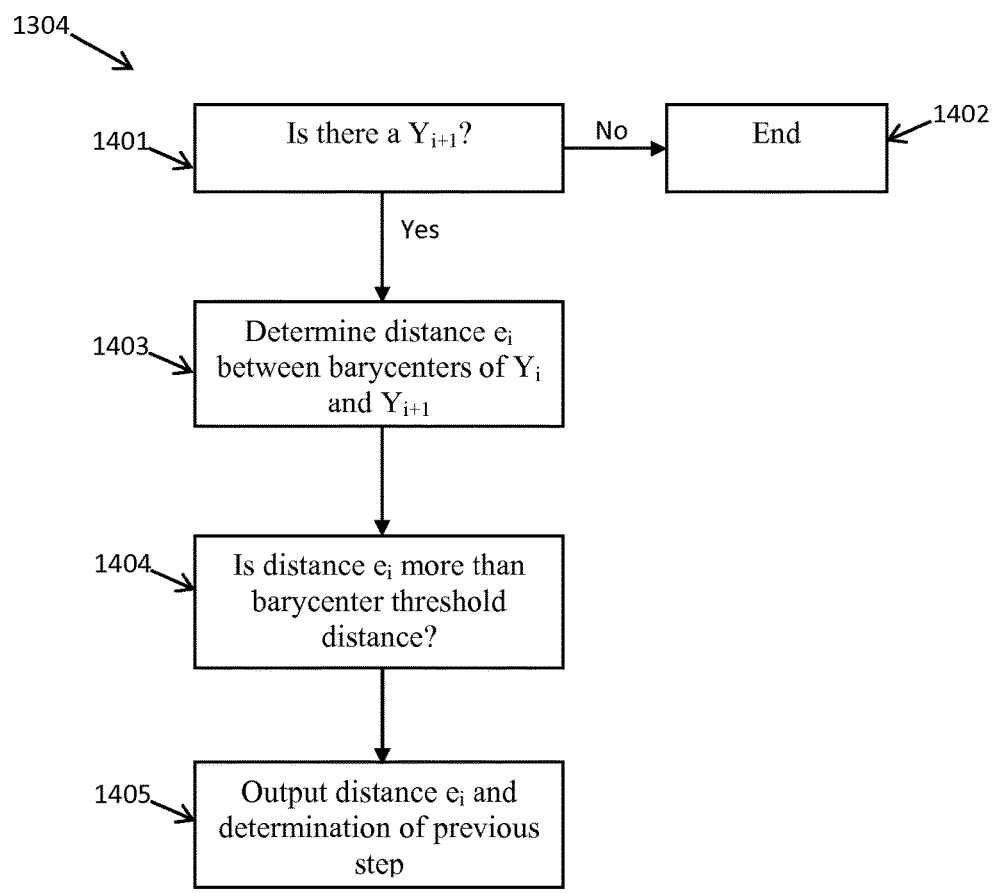
FIG. 14 shows a flow diagram of a portion of the flow diagram of FIG. 13.

Test 1 involves determining whether a (first) geometrical cost is more than a (first) pre-determined threshold. As shown in FIG. 14, this is done by first determining whether a next consecutive y-order element (i.e., $Y_{i+1}$) from the y-order element being tested (i.e., $Y_i$) is present (step 1401). If not (i.e., the last element is being tested), the (pre) processing ends (step 1402), and the recognition stage 118 progresses to the next step of recognition of the actual content of the elements. If a further y-order element is present, the (first) vertical distance $e_i$ between the barycenters of the current y-order element ($Y_i$) and the next consecutive y-order element ($Y_{i+1}$) is determined (step 1403). This distance represents the first geometrical cost and can be calculated or measured by pixel count, such that the pre-determination of the first threshold may be done in consideration of the pixel resolution of input surface 104. For example, in FIG. 10B the vertical distance $e_2$ between the barycenters of element 1002 and element 1003 is being considered, and in FIG. 11A the vertical distance $e_3$ between the barycenters of element 1003 and element 1004 is considered.

The current first geometrical cost $e_i$ is then compared to a (first) pre-determined (barycenter) threshold distance as a first test of confidence for there being multiple objects (step 1404). The result of this step is a 'yes' or 'no' determination. The setting of the first threshold may be done so a high level of confidence is achieved if a large barycenter separation of consecutive elements is present. For example, in FIG. 10B elements 1002 and 1003 overlap in the y-direction and the distance $e_2$ between these elements is relatively small. There should be little to no confidence that these elements belong to separate vertically displaced objects (it is noted that the distance $e_i$ is taken as an absolute value, since as in FIG. 10B the distance $e_2$ would otherwise be a negative value). Whereas in FIG. 11A, elements 1003 and 1004 do not overlap in the y-direction by some margin, and the barycenter distance $e_3$ between these elements is relatively large. There should be at least a reasonable amount of confidence that these elements may belong to separate vertically displaced objects. The determination of step 1404, e.g., 'yes' or 'no', and the first geometrical cost value $e_i$ is output by Test 1 (step 1405) for processing by the multiple test process at step 1306.

Figure 15:
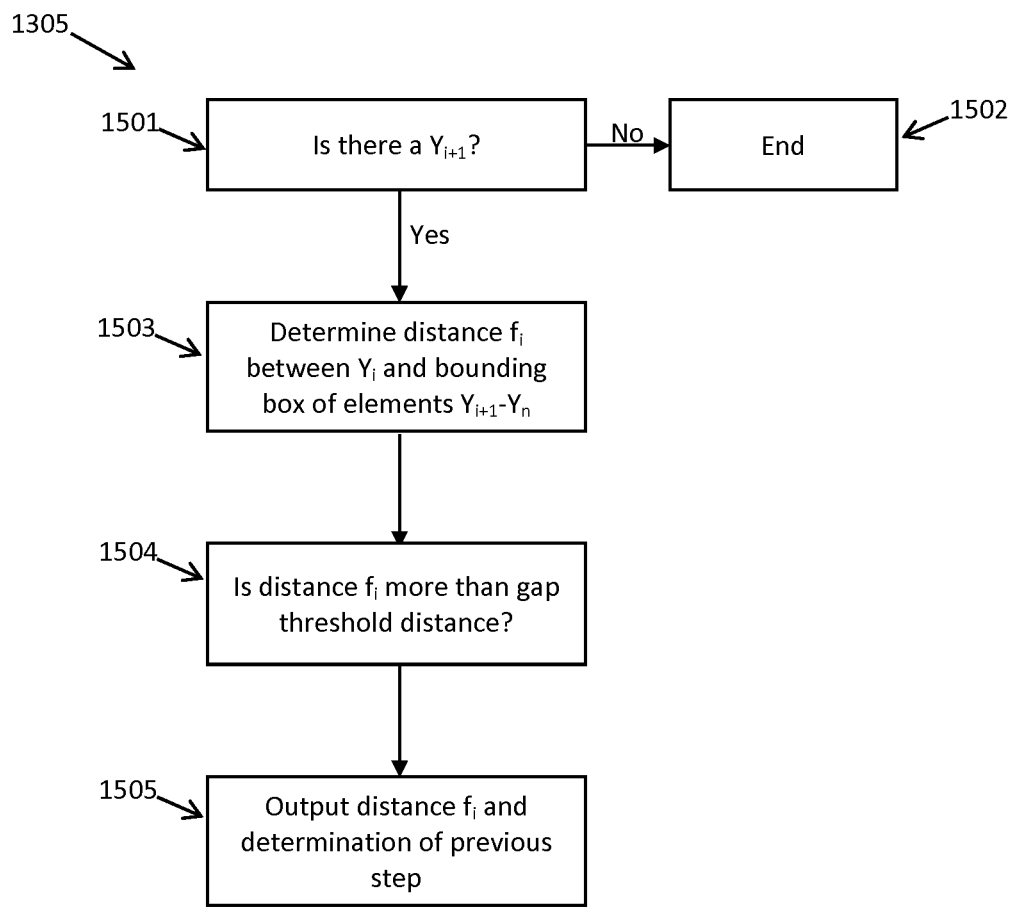
FIG. 15 shows a flow diagram of another portion of the flow diagram of FIG. 13.

Test 2 involves determining whether a (second) geometrical cost is more than a (second) pre-determined threshold. As shown in FIG. 15, this is done by first determining whether a next consecutive y-order element (i.e., $Y_{i+1}$) from the y-order element being tested (i.e., $Y_i$) is present (step 1501). If not (i.e., the last element is being tested), the (pre)processing ends (step 1502), and the recognition stage 118 progresses to the next step in the recognition of the actual content of the elements. This is a similar to step 1401 of Test 1, and this step may be combined as a pre-requisite step for the performance of Tests 1 and 2 on a given element. If a further y-order element is present, the (second) vertical distance $f_i$ between the current y-order element $(Y_i)$ and a bounding box defined about the next consecutive and subsequent y-order elements ($Y_{i+1}$ to $Y_n$) is determined (step 1503). This (geometrical boundary) distance represents the second geometrical cost and can be calculated or measured by pixel count, such that the pre-determination of the second threshold may be done in consideration of the pixel resolution of the input surface 104.

For example, in FIG. 10C the vertical distance $f_2$ between the lowest edge (i.e., in the y-direction) of element 1002 and the highest edge of bounding box 1007 bounding elements 1003-1006 is being considered. In FIG. 11B, the vertical distance $f_3$ between the lowest edge of element 1003 and the highest edge of bounding box 1107 bounding elements 1004-1006 is being considered. It is noted that the alternative y-defined edges of the elements and bounding box could be used for the distance calculation. Further, a bounding box need not be created. Rather, a 'cut' line may be created at a y-defined edge of the y-order element under consideration (Y) and the distance to a y-defined edge of the next consecutive y-order element calculated to determine the second geometrical cost.

The current second geometrical cost $f_i$ is then compared to a (second) pre-determined (gap) threshold distance as a second test of confidence for multiple objects (step 1504). The result of this step is a 'yes' or 'no' determination. The setting of the second threshold may be done so a high level of confidence is achieved if a large gap between consecutive elements is present. For example, in FIG. 10C elements 1002 and 1003 overlap in the y-direction, and the distance $f_2$ between these elements is relatively small. There should be little to no confidence that these elements belong to separate vertically displaced objects. Whereas in FIG. 11B, elements 1003 and 1004 do not overlap in the y-direction by some margin, and the distance $f_3$ between these elements is relatively large. Here, there should be at least a reasonable amount of confidence these elements may belong to separate vertically displaced objects. The determination of step 1504, e.g., 'yes' or 'no', and the second geometrical cost value $f_i$ is output by Test 2 (step 1505) for processing by the multiple test process at step 1306.

Returning to FIG. 13, in step 1306 the outputs of the determinations of Test 1 and Test 2 are combined in order to allow a decision to be made as to whether multiple objects are present, such as multiline equations. For the example of FIGS. 10B and 10C in which confidence of whether a 'cut' line should be created beneath element 1002 is tested, the result of Test 1 may be that the first geometrical cost is not greater than the first threshold—e.g., step 1404 returned a 'no'—and the result of Test 2 may be that the second geometrical cost is not greater than the second threshold—e.g., step 1504 returned a 'no'. Since both tests returned a 'no', the 'cut' decision in step 1307 would be to not create a 'cut' beneath the element 1002, leaving no cuts as depicted in FIG. 10A.

On the other hand, for the example of FIGS. 11A and 11B in which confidence of whether a 'cut' line should be created beneath element 1003 is tested, the result of Test 1 may be that the first geometrical cost is greater than the first threshold—e.g., step 1404 returned a 'yes'—and the result of Test 2 may be that the second geometrical cost is greater than the second threshold—e.g., step 1504 returned a 'yes'. Since both tests returned a 'yes', the 'cut' decision in step 1307 would be to create a 'cut' beneath element 1003. Because earlier tests of elements 1001 and 1002 result in no 'cut' being created, bounding box 1108 is positioned about elements 1001-1003 as depicted in FIG. 11C at step 1307 since the system is confident that object 1108 is a separate object from any object containing the later y-order elements. For example input 1000, continued processing would determine that since each of elements 1004-1006 overlap in the y-direction with one another, the tests on these elements would also not result in a cut being created. During the subsequent recognition processing, elements 1004-1006 would be considered to belong to a second object.

Depending on the input, the examples of FIGS. 10-15 may return results for certain elements where Test 1 outputs a 'no' but Test 2 outputs a 'yes', and vice-versa. For example, the barycenter distance (first geometrical cost) may be relatively large but the gap (second geometrical cost) between the elements may be relatively small, which may occur with a summation operation as in FIG. 8. In such a situation, the present system may simply consider that there is no confidence in there being multiple objects defined at the boundary of those elements. Indeed, this may indicate that one measurement is relatively inaccurate, and the other measurement is relatively accurate. Alternatively, other factors may be taken into account in order to adjust or hone the thresholds or allow exceptions. This may also be the case when both tests result in a 'no' output.

For example, if a large number of elements are present—i.e., step 1301 determines n is a relatively large number—but few or no cuts are created after performing the tests on all (or a statistically relevant number) of the elements. The present system may consider more cuts should have been created due to the large number of elements that may indicate the presence of multiple objects, particularly if the y-direction extent of the elements and relative sizes of the elements are also taken into account. The present system may then adjust one or both the barycenter and gap thresholds to allow more positive results to occur. This process should be performed with caution as the return of too many false positives will lead to inaccurate recognition in the next stage. Such decisions of adjustment can be assisted through the training of the present system using a statistically large number of input samples in an initialization exercise for setting the thresholds. This training can also be or on an ongoing basis, particularly if the HWR system 114 is hosted on a remote server.

As described earlier in relation to steps 1405 and 1505, the measured/calculated first and second geometrical costs may also be output by the separate tests. As illustrated in FIG. 13, these actual distances/costs may be considered in step 1307 when making the 'cut' decision. In one example, the actual value of the geometrical cost of a test that output a 'no' determination is compared to the threshold of that test to see if the difference is within a certain tolerance/percentage such that the result 'no' is changed to a 'yes' if the cost is within the tolerance. In another example, the actual value of the geometrical cost of a test that output a 'no' determination is compared to the actual, average or mean size of the elements to see if the cost is relatively large compared to the element size(s), such that the result 'no' is changed to a 'yes' if the cost is larger than the element size(s) by a certain percentage.

As discussed earlier, a further consideration is determining how the results of the separate tests affect the balance between speed and accuracy. In the present example, the first test (Test 1) considers the barycenter distances between consecutive y-order elements. The determination of stroke barycenters, or alternatively or additionally other stroke factors, and measurement/calculation of distances therebetween is performed relatively fast, e.g., within units of microseconds. However taking just these distances into account to decide where to 'cut' may result in many false positives, since stokes factors, such as barycenter displacement, alone are not accurate indicators of multiple objects, e.g., the strokes within a single equation may have many varied sizes such that barycenters of adjacent strokes are distributed widely but the gaps between the strokes are relatively small, such as in FIG. 16. Thus, Test 1 may be considered to provide relatively high processing speed but relatively low recognition accuracy.

On other hand, the second test (Test 2) considers the gap or inter-element distances between consecutive y-order elements, and its use of distances between bounding boxes or other grouping mechanisms of strokes provides a reasonably accurate indicator of multiple objects. However, the establishment of those groups may be performed relatively slowly, e.g., within tens to hundreds of microseconds. Thus, Test 2 may be considered to provide relatively high recognition accuracy but relatively low processing speed. As such, the combination of the two tests allows a balance between speed and accuracy, and this balance can be adjusted (e.g., by adjusting or weighting the corresponding thresholds) based on the needs of the system, e.g., speed is favored over accuracy, or vice-versa.

More precisely, the test which determines and compares displacement of common geometrical features of the content of the elements, e.g., the barycenter of the strokes may result in a relatively high number of cuts but an unacceptable proportion of these may be false positives, leading to higher inaccuracy. Whereas the test that determines and compares displacement of common or non-common geometrical features of the elements themselves, e.g., the same or different edges of the bounding boxes of the elements provides a relatively lower number of false positives but not enough cuts, leading to higher processing time.

Figure 17:
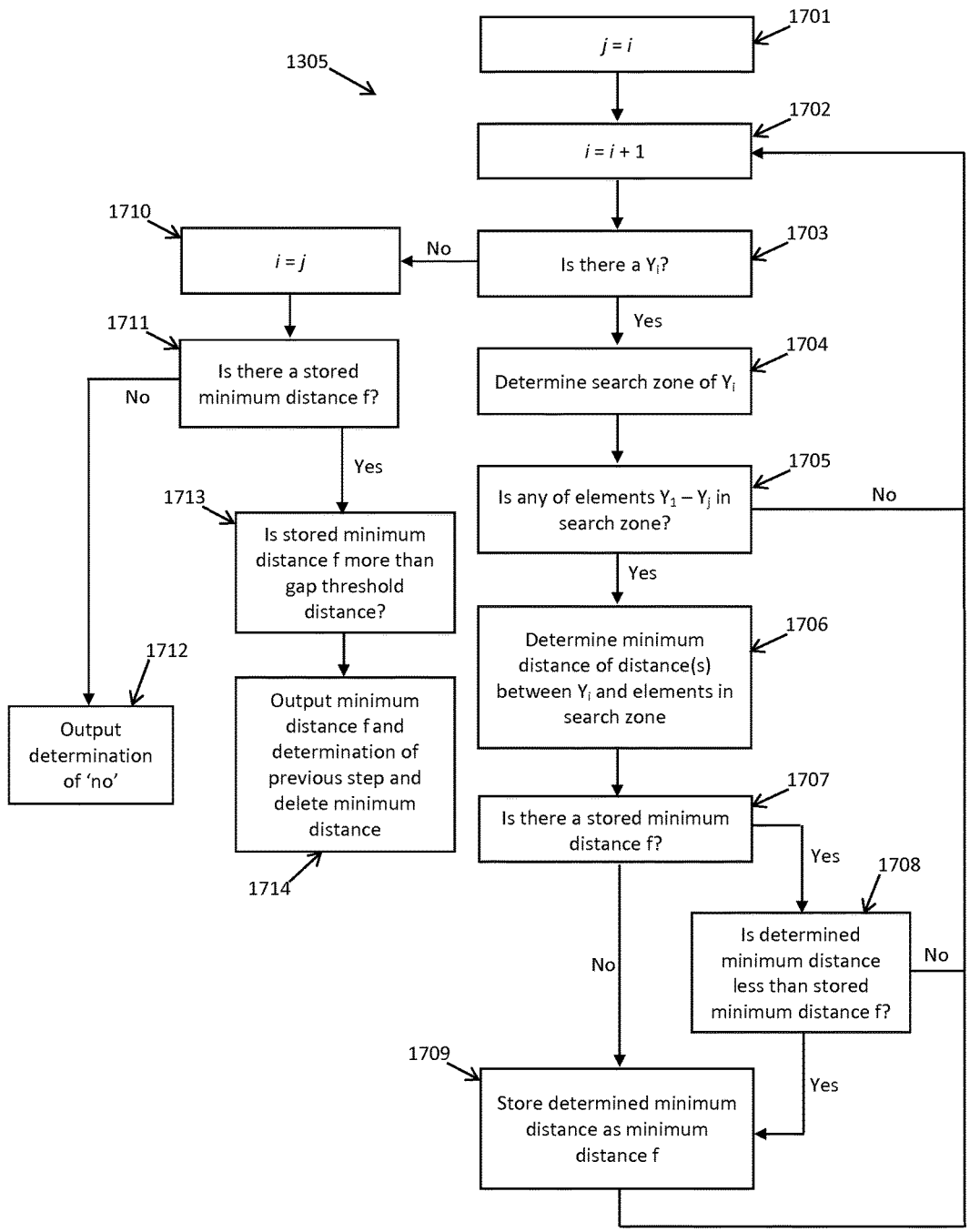
FIG. 17 shows a flow diagram of an alternative portion of the flow diagram of FIG. 13 as applied to the examples of FIG. 12.

Further improvement of the accuracy can be provided by an alternative example of the second geometrical test 1305, illustrated in FIGS. 12A-12C. Like the second test example of FIG. 11, this alternative second test (Test 2) involves determining whether a second geometrical cost is more than the second pre-determined threshold, where the second geometrical cost is determined from a (second) distance between y-order elements. However, unlike the previous example of Test 2, the second (gap) distance is determined from considering nearest neighbors in the y-order rather than just between consecutive y-order elements. This alternative test is now described with reference to the example flow diagram FIG. 17.

First a non-incremental parameter j is set to i (step 1701) for use in later steps, and the incremental parameter i is set to i+1 (step 1702) to allow iteration. After these initializations, it is determined whether a next consecutive y-order element (i.e., $Y_i$ due to the increment of the parameter i) from the y-order element being tested (i.e., $Y_j$ due to the setting of the parameter j) is present (step 1703). So long as further elements are found, a geometrical area as a search zone is determined for the next consecutive y-order element $Y_i$ (step 1704). The extent of this search zone is adjustable and used to determine the minimum distance between the next element(s) (in the y-order) and the current element under consideration (i.e., $Y_j$) and any prior elements in the y-order (i.e., $Y_1$-$Y_{j-1}$) to determine the second geometrical cost.

FIG. 12A shows search zone 1201 established above (i.e., in the y-direction) element 1004, being the next consecutive y-order element from current element 1003 (as depicted in FIG. 11). FIG. 12B shows search zone 1202 established above element 1005, being the next consecutive y-order element from element 1004. The search zone is established in an area that has a width (i.e., in the x-direction) that is three times the width x of the element of the search where this area is centered on that element, e.g., in FIG. 12A the area has a width $3x_4$ where $x_4$ is the width of the element 1004 and in FIG. 12B the area has a width $3x_5$ where $x_5$ is the width of the element 1005. This geometrical area in which to search for earlier y-order elements for determination of the closest point of separation between the elements at a potential 'cut' position, is used to provide 'padding' about elements so that consideration of distances between a sufficient and meaningful number of separated elements is provided. The amount of padding is adjustable, such that another integer or fractional width of the elements can be used and based on some other factor unrelated to the element width. For example, the padding could be provided by applying a characteristic of the handwritten strokes, such as the scale estimation value used by the recognizer in the recognition processing of the handwritten characters, symbols, etc. Accordingly, in FIG. 12 the search zone could be provided by establishing the area to be centered on each of elements 1004-1006 with a padding amount of three times (or other factor) the scale estimation value on each (horizontal) side of the elements. Those of ordinary skill in the art understand stroke characteristics, such as scale estimation values, to provide statistical character probability analysis.

Upon establishment of the search zone, it is determined if there are any elements from the current element being tested and prior elements (i.e., $Y_1$-$Y_j$) within the search zone (step 1705). If none of the y-order elements $Y_1$-$Y_j$ are within the search zone, the processing returns to step 1702 to iterate to a next element to be searched. If at least one of the y-order elements $Y_1$-$Y_j$ is within the search zone, the vertical distance(s) $f_{im}$ (where m=the number of the elements $Y_1$-$Y_j$ in the search zone) between the current next element any each of the elements $Y_1$-$Y_j$ above that element is calculated/measured and the minimum of these distances is determined (step 1706). For example, in FIG. 12A only element 1002 is in the search zone 1201 (where element 1003 is currently being tested) such that the distance $f_{41}$ between the element 1004 and element 1002 is returned as the minimum (gap) distance of element 1004. While the search zone is discussed as being established for elements below the element being tested to determine positional relationships with those elements above the bottom (i.e., in the y-direction) of the element being tested, those of ordinary skill in the art understand that the search zone may equally be established for elements above the element being tested to determine positional relationships with those elements below the bottom of the element being tested, for example.

In order to determine whether this minimum distance should be considered in later processing as the second geometrical cost (described later), it is first determined if a minimum distance f has been previously stored, for example, in the memory 108 (step 1707). If so, the determined minimum distance is compared with this previously stored minimum distance f (step 1708), and if not, the determined minimum distance is stored as the minimum distance f (step 1709). For example, in the processing of element 1004 in FIG. 12A, there is no previously stored minimum distance, so the minimum distance of element 1004 is stored. There may be input scenarios in which no minimum distance is determined since there are no y-order elements present in the search zone(s) of any tested element or there are no elements below the element being tested (i.e., the last element). This is accounted for in later steps of this example, however other ways to deal with this scenario include providing adjustment of the search zone in order to ensure that at least one minimum distance is calculated, or an arbitrarily second geometrical cost may be set in the initialization stage, e.g., a (pseudo) randomly generated cost value approaching infinity.

In the comparison of step 1708, if the current minimum distance is greater than the stored minimum distance, it is discarded and processing returns to step 1702, since this means that there is another element present which is closer to the potential first object than the element presently under consideration. On the other hand, if the current determined minimum distance is less than the stored minimum distance processing moves to step 1709 so that the current determined minimum distance is stored in place of the currently stored minimum distance f, and then processing returns to step 1702. For example, from FIGS. 12A and 12B it can be seen that element 1005 is closer to the element 1003 within its search zone 1202 than element 1004 is to element 1002 within its search zone 1201. Therefore, the minimum distance of element 1005 (being distance $f_{51}$ which is less than distance $f_{52}$) is stored in placed of the previously stored minimum distance $f_{42}$ of the element 1004 which is larger.

Once all elements under the current test element (e.g., element 1003 in FIG. 12) have been considered, step 1703 returns a 'no' and processing moves to the final stage of the alternative second test. In this stage, the incremental parameter i is first reset (step 1710) for use in the second test for the following consecutive elements (this step can follow the other steps of this stage). It is again determined whether a minimum distance f has been stored in the memory 108 (step 1711), and if not, the determination of 'no' with respect to the second geometrical cost being more than the second threshold is output to step 1306 (step 1712). This step is similar to step 1707 and repeated in this step to account for the above-described scenario in which no minimum distance is determined and stored in this alternative Test 2. If there is a stored minimum distance, being the second geometrical cost, this value is compared to the (second) gap threshold distance, as the second test of confidence (step 1713). Like the earlier example of Test 2, the setting of the second threshold in this alternative method may be done so a high level of confidence is achieved if a large gap between the tested elements is present. The result of this step is a 'yes' or 'no' determination, and the second geometrical cost value f is output by Test 2 (step 1714) for processing at step 1306.

It was earlier described in relation to FIGS. 11A and 11B that the result of Test 1 may be that the first geometrical cost is greater than the first threshold, and the result of Test 2 may be that the second geometrical cost is greater than the second threshold, such that the 'cut' decision in step 1307 would be to create a 'cut' beneath element 1003. However, the second threshold may be set for Test 2 such that in this example it falls between the second geometrical cost determined in the example method of FIG. 14 (i.e., the gap distance $f_3$ of FIG. 11B) and the second geometrical cost determined in the alternative method of FIG. 17 (i.e., the minimum distance $f_{51}$ of FIG. 12B), since the gap distance $f_3$ is less than the minimum distance $f_{51}$.

In this situation, the simpler Test 2 of the first example in which the bounding box of all elements below the element being tested is used to create the second geometrical cost will yield a 'no' determination. In this case, a 'cut' would not subsequently be created beneath element 1003. This would lead to bounding box 1109 being defined around all of elements 1001-1006 as illustrated in FIG. 11D, since continued processing would determine that elements 1004-1006 belong to the same object. On the other hand, the more complex Test 2 of the second example in which each element below the element being tested is individually used to create the second geometrical cost will yield a 'yes' determination. In which case, a 'cut' would subsequently be created beneath element 1003. This leads to bounding box 1108 being defined about elements 1001-1003 as depicted in FIG. 11C.

The alternative test may result in a more accurate determination of there being separate 2D objects in example input 1000. As such, the alternative tests for the second geometrical cost may both be performed to provide adjustment of the results returned from Test 2 and/or adjustment of the first and second geometrical cost thresholds.

As with the earlier example described with respect to FIGS. 6 and 7, the temporal or time-order entry of the strokes/elements may also be taken into account to adjust the first and second geometrical costs of the examples described in relations to FIGS. 10-17.

The above described examples may include recognition performed during incremental recognition of multiple object elements, such as the strokes in equations, in which the HWR system 114 includes a device, such as an incrementer, which continuously parses the input strokes/elements to the recognition engine (after preprocessing if present) upon input (or short delay thereafter; typically measured by strokes) so that recognition of the strokes is performed and the recognized elements are stored (cached) in the memory 108. In this way, the multiple object testing can be performed in parallel to the recognition so as soon as a separate object is determined, the recognition processing of the strokes within that object has already been performed such that these strokes need not be processed again (i.e., re-recognized) when processing the next and subsequent objects, thereby further optimizing speed of the recognition process.

The above-described example application of the methods and systems described herein are is to a handwritten input of vertically displaced objects, such as mathematical equations. As described earlier, any handwritten input of a 2D system of objects, such as drawings, diagrams, music, chemical formulas, etc., in which multiple objects are input and need to be separately recognized is also applicable as the described methods and systems provide recognition of multiple text, symbols and objects at any orientation. Further, as described earlier, not only vertical lists, for example, can be recognized, but the described methods and system also provide recognition of horizontal lists and arbitrarily placed objects.

Further, as mentioned earlier, the various examples described herein can be applied to forms of input for recognition other than handwriting, such as offline recognition in which images rather than digital ink are recognized, for example, the elements may be input as an image captured as a photograph of writing on paper or a whiteboard, digitally captured on an interactive smartboard, etc.

The described methods and systems increase processing and recognition speed of multiple objects, such as a vertical list of multiple mathematical equations, as multiple object recognition is performed independent of the recognition of the objects themselves. Further, complex multiple object input, such as complex systems of abstract arithmetical equations, is enabled without confused recognition results. Furthermore, writing of multiple objects, such as equations, does not require specific user action for recognition, such as creating a new writing area, tapping a new line button, etc. Further still, matching of strokes/elements to artificial structure, such as tables, is not required for recognition of multiple objects. Further, no learning or training of the algorithm required, however this could be performed to improve results.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

I claim:

1. A method of recognizing handwritten input of multiple objects to a computing device, the computing device comprising a processor and at least one application for recognizing the input under control of the processor, the method comprising the steps of:

determining, with the application, at least one geometrical feature of a plurality of elements of the input;

comparing, with the application, the determined at least one geometrical feature with at least one pre-determined geometrical threshold to determine a positive or negative result; and deciding a number of objects to which the elements belong as being one or a plurality based on the comparing step, wherein the deciding step associates a determination of the negative result with the elements belonging to one object, and the deciding step associates a determination of a positive result with the elements belonging to multiple objects, wherein the at least one geometrical feature includes one or more distances between pairs of elements of the plurality of elements, wherein the one or more distances is between one or more factors of the content of each element of each pair of elements, wherein the one or more factors includes at least one of a factor common to the elements of each pair of elements and a geometrical boundary including each element, wherein the comparison includes comparing a first distance with a first pre-determined distance threshold and a second distance with a second pre-determined distance threshold for each pair of elements, and wherein, for each pair of elements:

the first distance is the distance between the common factor of the elements;

the second distance is the distance between the geometrical boundary of the elements;

the first pre-determined distance threshold is a common factor distance threshold; and the first pre-determined distance threshold is a geometrical boundary threshold.

2. A method as claimed in claim 1, wherein:

each element of each pair of elements represents one or more handwritten strokes;

the common factor is the barycenter of the one or more strokes;

the at least one pre-determined geometrical threshold is a barycenter distance threshold; and the comparison yields a positive result if the barycenter distance determined for a pair of elements is greater than the barycenter distance threshold, such that the elements of the pair of elements are considered as belonging to different objects.

3. A method as claimed in claim 1, wherein:

the at least one pre-determined geometrical threshold is a geometrical boundary distance threshold; and the comparison yields a positive result if the geometrical boundary distance determined for a pair of elements is greater than the geometrical boundary distance threshold, such that the elements of the pair of elements are considered as belonging to different objects.

4. A method as claimed in claim 1, wherein the comparison yields a positive result for a pair of elements if both the first and second distances are greater than the respective first and second pre-determined distance thresholds, such that the elements of the pair of elements are considered as belonging to different objects.

5. A method as claimed in claim 1, wherein:

each element of each pair of elements represents one or more handwritten strokes; and the common factor is the barycenter of the one or more strokes.

6. A method as claimed in claim 1, wherein the elements of each pair of elements are geometrically adjacent.

7. A method as claimed in claim 1, further comprising determining, with the application, at least one of a positional and temporal order of input of the elements of the plurality of elements.

8. A method as claimed in claim 7, wherein the at least one geometrical threshold is pre-determined with consideration of the determined temporal order of input of the elements.

9. A method as claimed in claim 7, wherein, for at least one pair of the pairs of elements:
- the determining of the at least one geometrical feature includes:
  - determining, with the application, the geometrical boundary distances between pairs of elements which each contain a first element having a first positional order relationship with one element of the at least one pair and a second element having a second positional order relationship with the other element of the at least one pair; and
  - determining, with the application, the minimum distance of the determined geometrical boundary distances;
- the at least one pre-determined geometrical threshold includes a geometrical boundary distance threshold;
- the comparison includes comparing the determined minimum geometrical boundary distance with the geometrical boundary distance threshold; and
- the comparison yields a positive result if the determined minimum geometrical boundary distance is greater than the geometrical boundary distance threshold, such that the elements of the at least one pair are considered as belonging to different objects.

10. A method as claimed in claim 9, wherein the positional order is directional, the first and second directional relationships being first and second directions from the elements of the at least one pair, respectively.

11. A method as claimed in claim 9, wherein the pairs of first and second elements contain first elements within a geometrical area of the second element.

12. A method as claimed in claim 11, wherein:
- each element of each pair of elements represents one or more handwritten strokes; and
- the geometrical area is based on a characteristic of the one or more handwritten strokes.

13. A computer program product, comprising a non-transitory computer usable medium having a computer readable program code embodied therein, said computer readable program code adapted to be executed to implement a method for recognizing handwritten input of multiple objects to a computing device, the computing device comprising a processor and at least one application for recognizing the input under control of the processor, the method comprising the steps of:

- determining, with the application, at least one geometrical feature of a plurality of elements of the input;
- comparing, with the application, the determined at least one geometrical feature with at least one pre-determined geometrical threshold to determine a positive or negative result;
- deciding a number of objects to which the elements belong as being one or a plurality based on the comparing step,
- wherein the deciding step associates a determination of the negative result with the elements belonging to one object, and the deciding step associates a determination of a positive result with the elements belonging to multiple objects,
- the computer program product further comprising determining, with the application, at least one of a positional and temporal order of input of the elements of the plurality of elements,
- wherein the at least one geometrical feature includes one or more distances between pairs of elements of the plurality of elements,
- wherein, for at least one pair of the pairs of elements:
- the determining of the at least one geometrical feature includes:
  - determining, with the application, the geometrical boundary distances between pairs of elements which each contain a first element having a first positional order relationship with one element of the at least one pair and a second element having a second positional order relationship with the other element of the at least one pair; and
  - determining, with the application, the minimum distance of the determined geometrical boundary distances;
- the at least one pre-determined geometrical threshold includes a geometrical boundary distance threshold;
- the comparison includes comparing the determined minimum geometrical boundary distance with the geometrical boundary distance threshold; and
- the comparison yields a positive result if the determined minimum geometrical boundary distance is greater than the geometrical boundary distance threshold, such that the elements of the at least one pair are considered as belonging to different objects.

* * * * *